(12) United States Patent
Carmignani et al.

(10) Patent No.: US 11,230,344 B2
(45) Date of Patent: Jan. 25, 2022

(54) ELECTRIC DRIVE MOTORCYCLE

(71) Applicant: PIAGGIO & C. S.P.A., Pontedera (IT)

(72) Inventors: Luca Carmignani, Pontedera (IT); Alessio Sisi, Pontedera (IT); Emiliano Guidi, Pontedera (IT)

(73) Assignee: Piaggio & C. SPA, Pontedera (IT)

(*) Notice: Subject to any disclaimer, the term of this patent is extended or adjusted under 35 U.S.C. 154(b) by 159 days.

(21) Appl. No.: 16/761,118

(22) PCT Filed: Oct. 30, 2018

(86) PCT No.: PCT/EP2018/079645
§ 371 (c)(1),
(2) Date: May 1, 2020

(87) PCT Pub. No.: WO2019/086414
PCT Pub. Date: May 9, 2019

(65) Prior Publication Data
US 2020/0277019 A1    Sep. 3, 2020

(30) Foreign Application Priority Data

Nov. 2, 2017    (IT) .......................... 102017000124880

(51) Int. Cl.
*B62K 19/46*    (2006.01)
*B62J 1/12*    (2006.01)
(Continued)

(52) U.S. Cl.
CPC ................ *B62K 19/46* (2013.01); *B62J 1/12* (2013.01); *B62J 9/14* (2020.02); *B62J 11/19* (2020.02);
(Continued)

(58) Field of Classification Search
CPC ........................................................ B62J 9/14
See application file for complete search history.

(56) References Cited

U.S. PATENT DOCUMENTS 5,540,312 A * 7/1996 Ogawa .................... B60L 53/18
                                                    191/12 R
8,706,336 B2 * 4/2014 Inui .......................... B62J 17/00
                                                    701/22

FOREIGN PATENT DOCUMENTS

CN        1167464 A    12/1997
CN      104364144 A     2/2015
(Continued)

OTHER PUBLICATIONS

China National Intellectual Property Administration: Search Report for corresponding Patent Application No. 201880071742.X dated Apr. 12, 2021, 2 pages.
(Continued)

*Primary Examiner* — Minnah L Seoh
*Assistant Examiner* — Hosam Shabara
(74) *Attorney, Agent, or Firm* — Patterson Intellectual Property Law, P.C.; Gary L. Montle; William E. Sekyi

(57) ABSTRACT

In an electric traction motorcycle (100) the ignition of the motor and the related vehicle start his avoided if the electric supply accessories are not correctly in place, and to this purpose the motorcycle comprises: a front portion comprising one or more front wheels (103) and a handlebar (104); a rear portion comprising a saddle (101), a shell body (107) arranged below said saddle (101), and a rear wheel (105) arranged below said shell body (105); an intermediate portion (108) extending as a connection between said front portion and said rear portion; an electric drive unit (8) connected to said rear wheel (105); a power supply unit supplying said electric drive unit (8); and a helmet carrying compartment (11), placed inside the shell body (107) below the saddle (101), which is accessible by shifting said saddle (101) in an open position, wherein the shifting of the saddle (101) in an open position uncovers a service surface (150) therebelow a power lead cable compartment (56) is arranged (Continued)

which includes a power lead cable (54) which, when it is in retracted configuration, allows the complete closure of the saddle (101) and it is wholly included in its compartment (56); said compartment (56) has a shape so as to adapt to the space available at a rear wall of the helmet carrying compartment (11) and of the rear wall of the shell body (107), the power lead cable (54) having a connecting socket (57) and a respective seat (59) wherein it is placed in a resting position, and wherein, in such seat (59) a sensor is provided which detects the positioning of the connecting socket (57) and which provides, to a control unit of the motorcycle (100), a signal allowing to start the motorcycle (100).

11 Claims, 16 Drawing Sheets

(51) Int. Cl.
| | | |
|---|---|---|
| *B62K 11/10* | (2006.01) | |
| *B62J 9/14* | (2020.01) | |
| *B62J 11/19* | (2020.01) | |
| *B62J 35/00* | (2006.01) | |
| *B62J 43/16* | (2020.01) | |
| *B62J 43/20* | (2020.01) | |
| *B62J 45/40* | (2020.01) | |

(52) U.S. Cl.
CPC ............ *B62J 35/00* (2013.01); *B62J 43/16* (2020.02); *B62J 43/20* (2020.02); *B62J 45/40* (2020.02); *B62K 11/10* (2013.01); *B62K 2202/00* (2013.01); *B62K 2204/00* (2013.01)

(56) References Cited

FOREIGN PATENT DOCUMENTS

| | | | |
|---|---|---|---|
| EP | 0608841 A1 * | 8/1994 | ............ B60L 50/66 |
| EP | 1481881 A2 | 5/2004 | |
| EP | 1481881 A3 | 2/2005 | |
| EP | 1738947 A2 | 1/2007 | |
| FR | 2669585 A1 | 5/1992 | |
| JP | 3343361 B2 | 6/1991 | |
| JP | 2001213373 A | 8/2001 | |
| JP | 3343361 B2 | 11/2002 | |
| JP | 2007008349 A | 1/2007 | |

OTHER PUBLICATIONS

China National Intellectual Property Administration: Notification of the First Office Action for corresponding Patent Application No. 201880071742.X dated Apr. 19, 2021, 8 pages.

European Patent Office: International Search Report for PCT/EP2018/079645, dated Jan. 31, 2019.

* cited by examiner

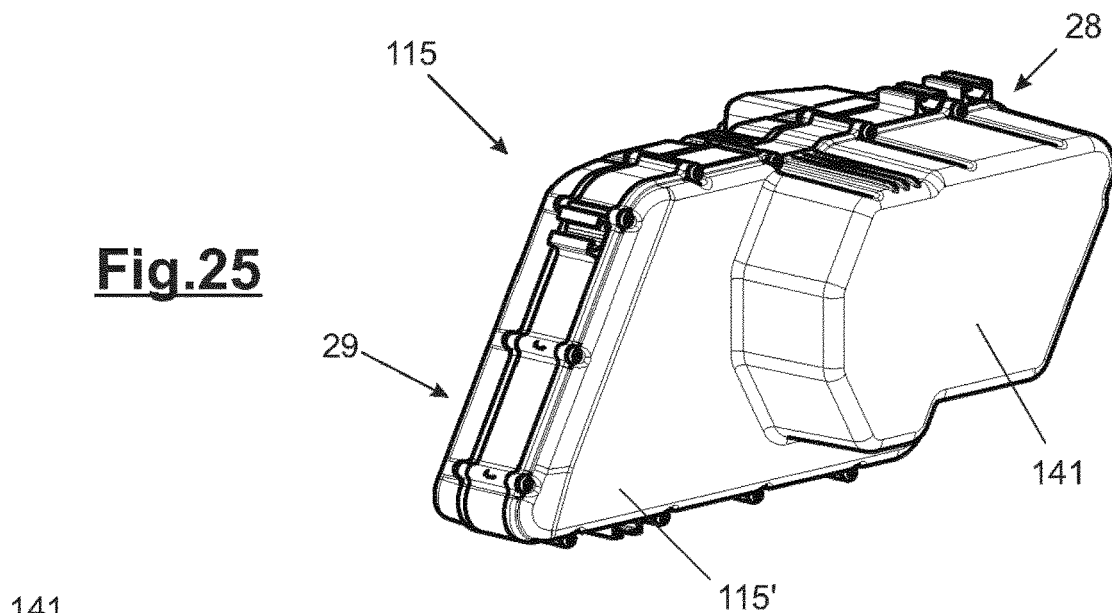
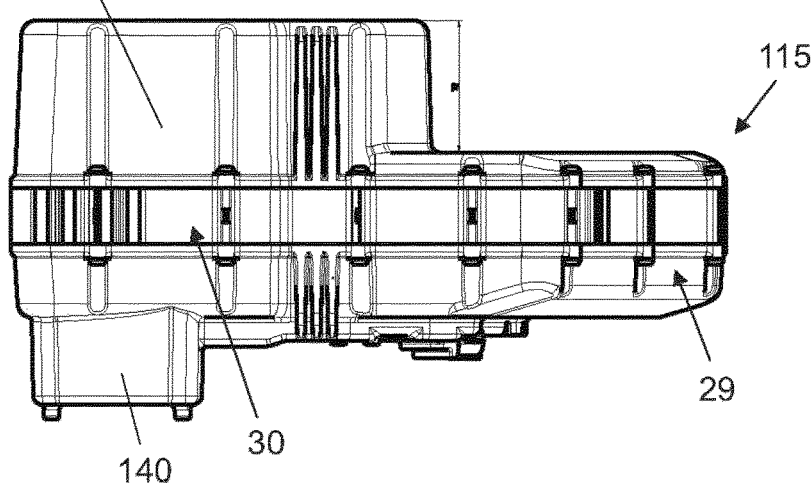
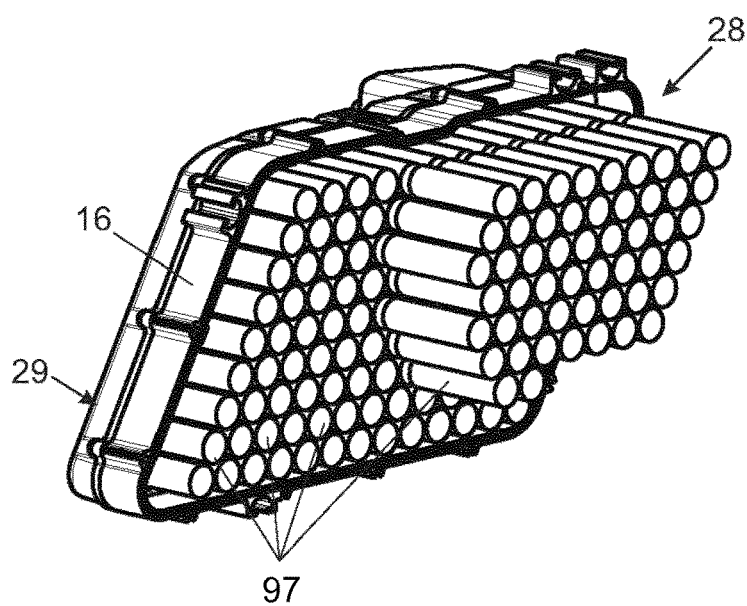

ELECTRIC DRIVE MOTORCYCLE

The present invention relates to an electric drive motorcycle, the traction thereof is ensured by the energy stored in a battery, or generated by an electric generator, which feeds an electric motor.

In particular, the motorcycle which will be described is of the type having generally a front portion with one or more front wheels and a handlebar, a rear portion with a saddle, a shell body under the saddle, and at least a rear wheel, a footplate-like intermediate portion connecting the front and rear portions, an electric drive unit with a transmission unit and a power supply unit of the drive.

This type of vehicles, in particular suitable to be used in urban area, requires the use of the helmet both for the driver and the possible passenger, even when the local rules do not confirm the compulsoriness of such use. Therefore, in order to avoid that the driver and passenger should take with them their helmets when not used, the motorcycle is equipped with a suitable helmet carrying compartment which, in the present case, is accessible through the saddle which, to this purpose, is shifted to access such compartment.

However, in the motorcycles wherein said rear portion is separated from the footplate which plays only a joining and resting function for the driver's feet, the space available for a sufficiently capacious helmet carrying compartment is limited, considering the other portions of the vehicle which have to be received in the rear shell body.

Furthermore, this type of vehicles requires the use of a control unit the positioning thereof, inside the shell body, is quite delicate both because it tends to occupy a relevant space and because it requires a certain level of protection against any outer agent, as debris, water, mud and so on.

The control unit comprises electric and electronic components thereto a constant cooling has to be ensured, with particular reference to the power components, which develop a considerable residual heat.

In the same rear portion which receives the helmet carrying compartment, even a battery unit has to be housed which allows an adequate autonomy for normal use needs.

In fact, the capacity in terms of electric charge of a battery unit substantially is linked to the volume occupied thereby. The battery unit is then housed in a space, defined by a shell body, which is intended to house other several portions of the motorcycle, reducing the available space.

Even more so, this drawback is felt when the shell body not only includes the batteries for the electric drive, but even a thermal engine for guaranteeing the recharge thereof which, together with the batteries themselves, constitute a supply unit of the electric drive.

The presence of this engine then involves a sensible overall dimension problem, which reflects even on the space which has to be arranged for the above-mentioned battery unit.

Moreover, the operation of the hybrid system has to face well precise cooling needs. If, on one side, the thermal engine at issue, for example a single-cylinder engine, can be conveniently air cooled, on the other side the battery unit has to be able to be cooled down notwithstanding, for obvious protection reasons, it is received in a sealed container.

A not effective cooling of the battery unit could determine several malfunctions and a reduction in the motorcycle autonomy, considering that exactly the same thermal engine could constitute a dangerous heat source for the battery unit.

The same overall dimension problem then reflects onto the components of the thermal engine. For example, in case of the filter box which receives air and transfers it, through the filters inside the box and suitable ducts, to the throttle body/carburettor of the thermal engine, the traditional position of the transmission on the motorcycle side is not available, and in particular due to the battery unit which, in order to increase the vehicle autonomy, has to be able to exploit each available space, preferably remaining compact.

The technical problem underlying the present invention is to provide an electric drive motorcycle allowing to obviate the drawbacks mentioned with reference to the known art.

Such problem is solved by a motorcycle as specified above, wherein the power supply unit is arranged in a position below the helmet carrying compartment, so that the saddle, the helmet carrying compartment and said power supply unit are substantially arranged piled up therebetween in the shell body.

The main advantage of this motorcycle lies in allowing an effective arrangement of the portions inside the shell body of the vehicle, at the same time allowing the helmet carrying compartment to have the volume required to carry out its own function.

According to another herein described invention aspect, in the above specified motorcycle a rear fork is provided which connects revolvingly said rear wheel to said shell body, allowing a swinging motion with respect to a hinge connected to the shell body.

The above-mentioned control unit of the electric drive unit and of the supply unit included in a container is surrounded at least partially by said at least a supporting arm during the swinging motion thereof with respect to the shell body.

In this way, an effective arrangement of the portions inside the shell body of the vehicle is provided, at the same time by guaranteeing to the control unit the required protection.

Another invention aspect provides that the control unit is included in a box-like body connected to the shell body so that a lower wall thereof is faced towards the ground and it preferably comprises cooling fins, so as to guarantee an effective cooling of the control unit, since said lower wall is obviously exposed to an air flow during the motorcycle running.

The problems related to the overall dimensions of the portions inside the shell body of the rear portion are solved by a battery unit which is shaped so as to have a polyhedral shape comprising at least a first tilted side with respect to a vertical plane orthogonal to the front-rear direction of the motorcycle, to allow an effective arrangement of the battery unit, by optimizing the available space.

In a preferred version of the motorcycle, the saddle shifting uncovers a flat service surface below thereof a feeder cable compartment is arranged including a feeder cable, which has a connecting socket which, in a rest position, is received in a respective seat. When this rest condition is not implemented, for example since the connecting socket is connected to the electrical network or since it has been disconnected but it has not yet been put in its place, the vehicle start is inhibited by a control unit.

On the contrary if the socket is in its seat, the cable with the related socket is in retracted configuration, the complete closure of the saddle is possible, whereas the cable is wholly included in the compartment thereof which has a shape so as to adapt to the available space at a rear wall of the helmet carrying compartment and of the rear wall del shell body of the saddle allowing that the motorcycle starts safely.

When the supply unit which feeds said electric drive unit is of the hybrid type and comprises a battery unit and a thermal engine which actuates an electric generator for feeding the battery unit and/or said electric drive unit, inside the shell body and below the saddle, a housing space is provided apt to receive the battery unit and the thermal engine, with the related electric generator, placed side by side therebetween, thus allowing an adequate arrangement of the elements arranged for feeding electric current to the motorcycle electric drive.

Preferably, said housing space extends from one side to the other one of the shell body, with the battery unit and the thermal engine with the related electric generator housed inside thereof, in particular placed side by side according to a direction transversal to the front-rear direction of the motorcycle.

Moreover, according to another invention aspect which will be described, the thermal engine actuates a cooling fan so as to suck a refrigerating air flow in a suction orifice, so that such flows, before being sucked, touches the battery unit, by allowing, when the thermal engine is operating, an effective cooling of the battery unit apart from the same thermal engine.

The hybrid version provides a duct for discharging the fumes with an expansion chamber and a filter box, for feeding air to the thermal engine, which is arranged laterally, at the rear wheel and on the side wherein said thermal engine is arranged, in a space received above thereof so as to obtain, above the expansion chamber, a space covered by the shell body.

In this version, preferably the tank intended to feed the thermal engine is arranged so as to surround partially the side walls of the helmet carrying compartment in a position adjacent to the feeder cable compartment. It has an upper end arranged in proximity of the saddle, with a refuelling nozzle closed by a fuel cap, projecting from the service surface of the shell body.

All above-mentioned aspects of the present invention will be described hereinafter according to two preferred embodiment examples of the motorcycle with electric drive, provided by way of example and not with limitative purpose with reference to the enclosed drawings wherein:

FIG. 25 shows a perspective view of a battery pack of the electric drive hybrid motorcycle of FIG. 15;

FIG. 26 shows a top view of the battery pack of FIG. 25;

FIG. 27 shows a perspective view in section of the battery pack of FIG. 25, according to a first longitudinal plane;

Figure 1:
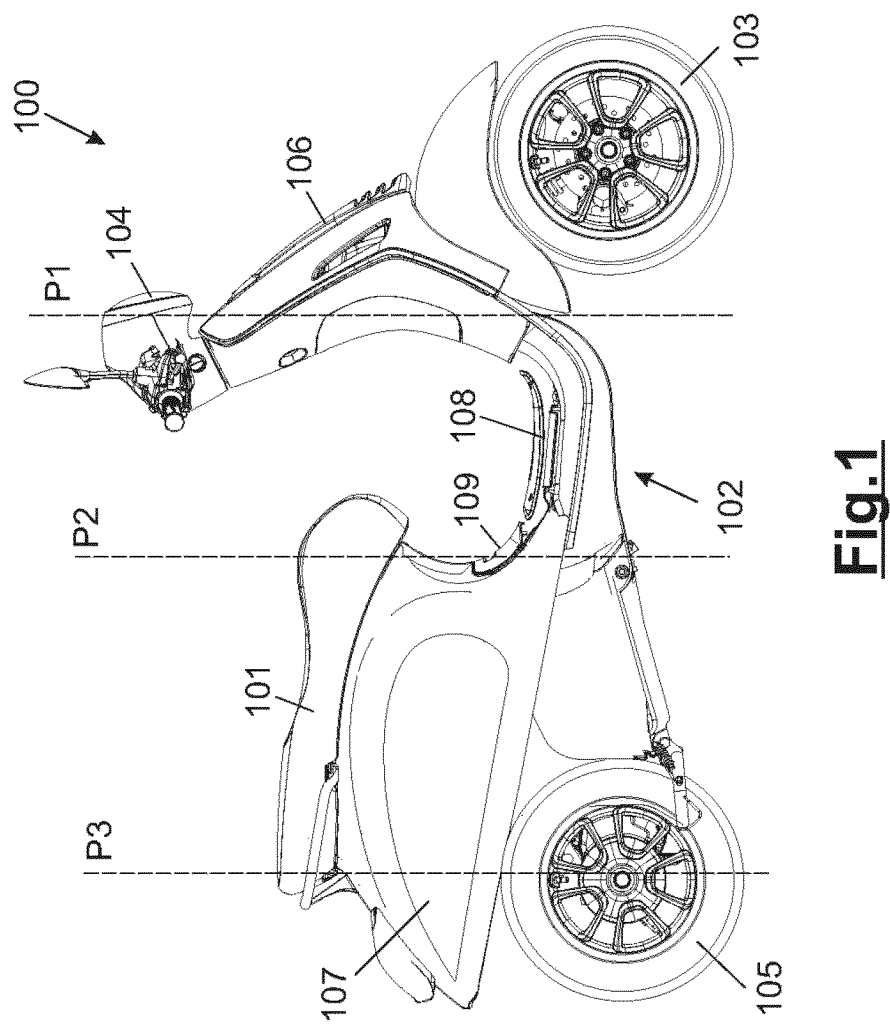
FIG. 1 shows an overall side view of an electric drive motorcycle according to the present invention.

By referring to FIG. 1, an electric drive motorcycle, and in particular a motor-scooter or simply a scooter, is designated as a whole with 100. The invention relates to the field of the saddle vehicles, or vehicles which are driven astride, generally, having two, three or four wheels, with particular reference to the scooters having a drive unit arranged in a position below a saddle 101, inside a shell 102 which herein is represented laterally, which extends from a front wheel 103, driven by a handlebar 104 to a rear driving wheel 105.

Figure 2:
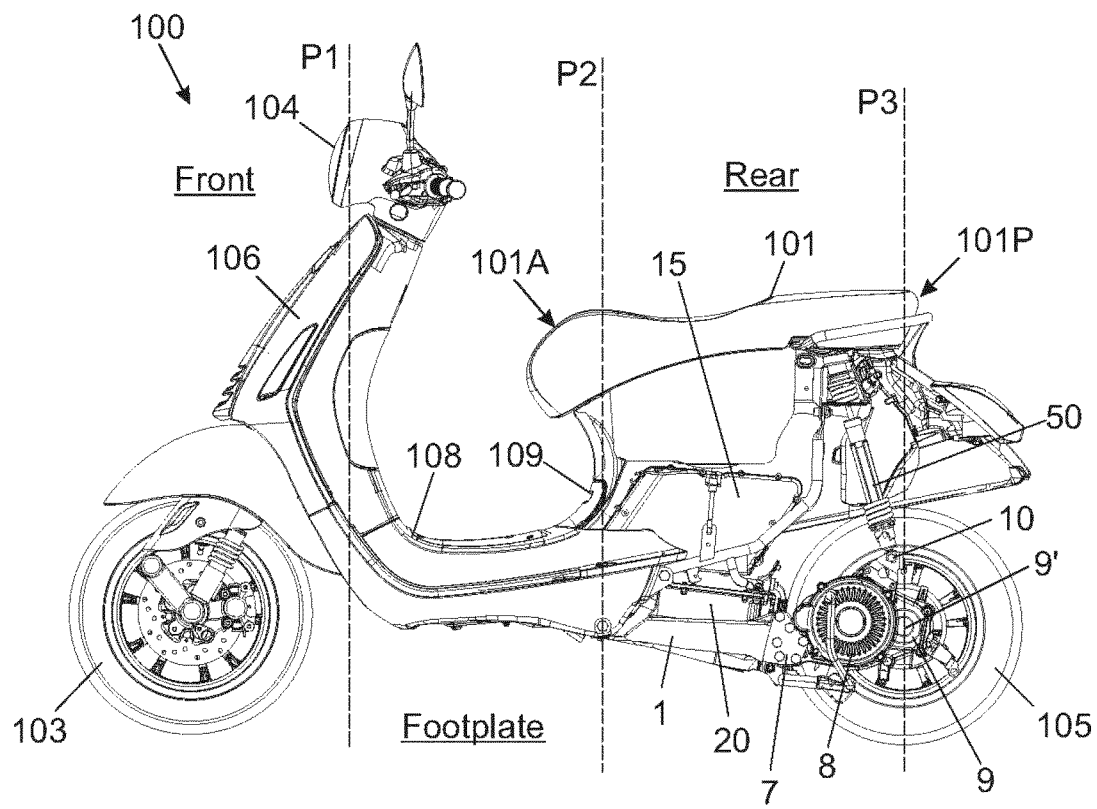
FIG. 2 shows a left-side view and in partial section of the electric drive motorcycle of FIG. 1.

By referring to FIG. 2, the scooter 100 is of the type substantially divided into three portions in longitudinal direction: a Front portion including the front wheel 103 and the handlebar 104 joined by a front fork having a front suspension, with a front shield 106 which protects the legs and at least partially the bust of a driver sitting on the saddle 101; a Rear portion including the saddle 101, the rear wheel 105 and a shell body 107 enclosing inside thereof several components such as for example the drive, control, electric energy storing elements.

In a not illustrated particular version of the motorcycle, the front portion can include two front wheels connected therebetween and to the frame by means of a steering roll four-bar linkage.

The rear wheel 105 is connected to a rear suspension 50.

An intermediate portion or Footplate 108 joins therebetween—like a bridge—the front portion and the rear portion, that is the front shield 106 and the shell body 107, with in particular substantially flat resting base or footplate 108, thereupon the driver rests his/her feet.

These three portions ideally are separated and defined by a first plane P1 and a second plane P2, arranged transversal to the motorcycle and orthogonal to the ground, that is perpendicular to the provided forward running direction. The first and second plane are geometrical planes which allow to identify the motorcycle portions thereto it is referred in the present description.

In other words, a first front plane P1 is defined which cuts transversally the front portion of the motorcycle substantially at the handlebar, and a second intermediate plane P2 is defined which cuts transversally the rear portion of the motorcycle at the front end 101A of the saddle 101 which is faced towards the front shield 106. Between the front plane P1 and the intermediate plane P2 the intermediate portion 108 is arranged which comprises the resting footplate 108 for the driver.

A third rear plane P3 is further shown at the rear end 101P of the saddle 101.

At the second plane or intermediate plane, designated with P2 in FIG. 2, the saddle 101 is revolvingly hinged at the front end thereof 101A to the shell 102, whereas the shell casing has a front wall 109.

Moreover, the motorcycle 100 has a rear fork 1 which is hinged to the shell 102 at the footplate 108, around an axis substantially lying on said intermediate transversal vertical plane P2.

Figure 4:
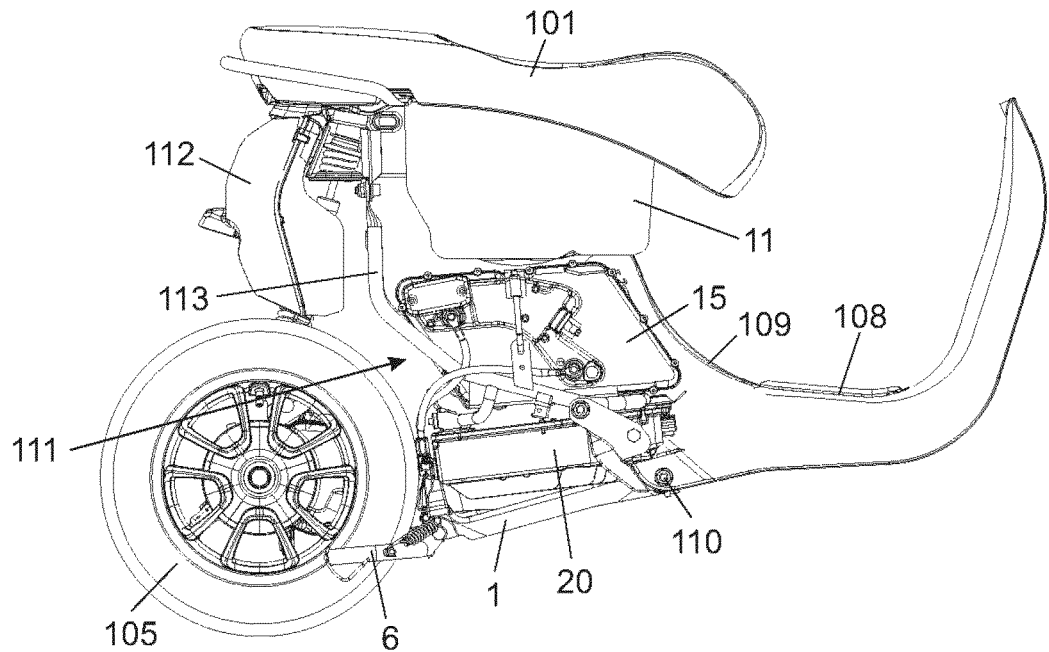
FIG. 4 shows a side view of the rear portion of FIG. 2, wherein some outer elements are missing to make visible the inner portions.
Figure 6:
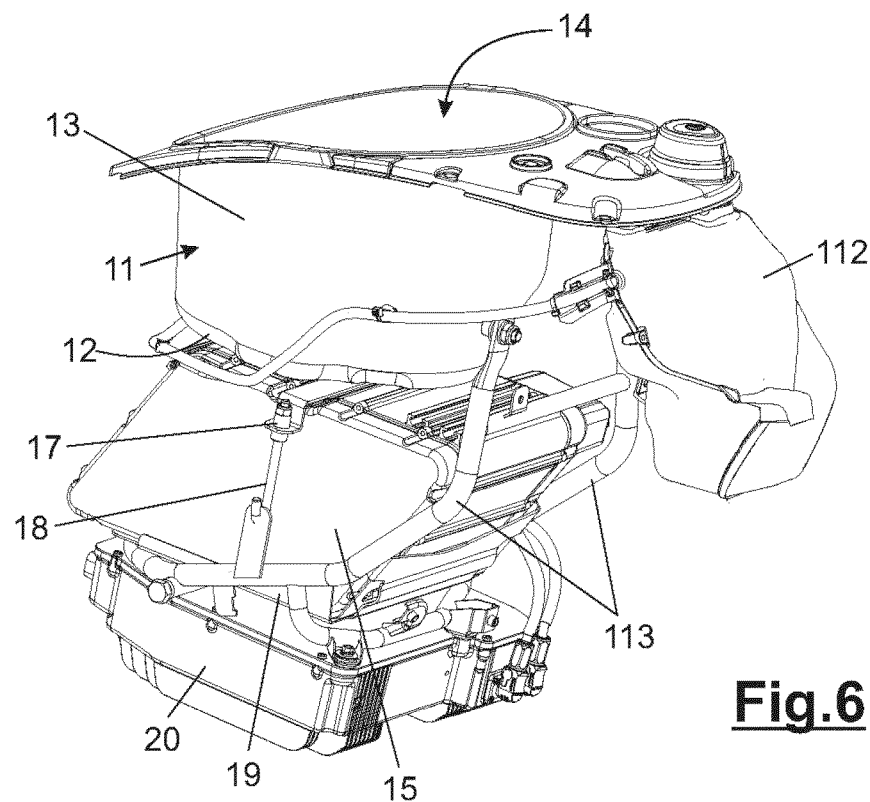
FIG. 6 shows a perspective view of some components piled up in the rear portion of FIG. 4.
Figure 7:
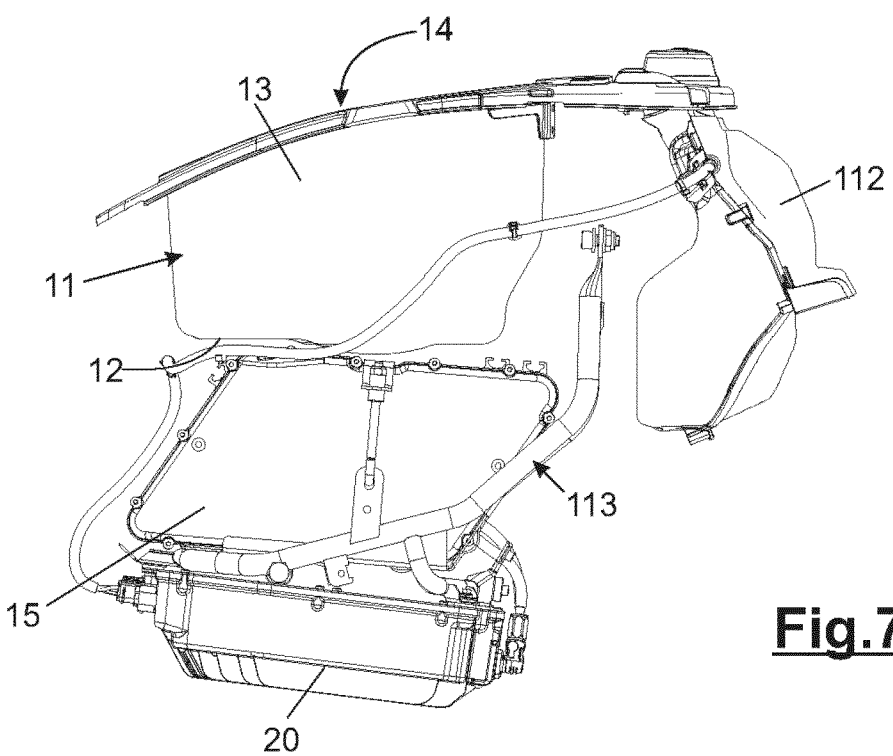
FIG. 7 shows a side view of some components piled up in the rear portion of FIG. 4.

As it is better shown in FIGS. 4, 6 and 7, in the rear portion of the shell a helmet carrying compartment 11 is provided, substantially constituted by an open container at its own top, having a bottom wall 12, side walls 13 extending from the bottom wall 12, having a shape so as to adapt to the shell shape to maximize the containment volume so that it could include preferably one or two helmets. The side walls 13 define—on the side opposite to the bottom wall 12—an upper opening 14 which is made accessible or closed by the saddle 101 acting as revolving cover.

In particular, there is a supporting frame 113, for example truss-like type, which defines the service compartment 111, wherein the supply unit is arranged.

As said previously, the motor 8, that is the electric drive unit of the motorcycle 100, requires the presence of a supply unit of the motorcycle, which feeds said drive unit.

In this first embodiment, illustrated in FIGS. 1 to 14, the traction of the electric motorcycle is guaranteed by a supply unit, in particular a unit fed by the electric energy stored in a battery, which in turn feeds an electric motor 8, and which can be recharged by connecting it to a source of electric energy and/or to a suitable mains-supply unit with a socket 57 (FIGS. 32-35), the functions thereof and features will be described hereinafter.

By referring to FIGS. 9 to 12, the supply unit, in the present embodiment, comprises a battery unit designated as a whole with the reference 15, that is a battery pack constituted by a battery casing 16 and by a plurality of battery cells 97 (FIG. 8) inserted inside the casing 16.

The supply unit, that is the battery unit 15, is arranged in a position below the helmet carrying compartment 11, with an arrangement so that the saddle 101, the helmet carrying compartment 11 and the battery unit 15 are substantially arranged piled up therebetween one over the other one in the shell body 107, vertically (FIGS. 4-8).

Under the term piled up an arrangement of the following components overlapped one another in a substantially aligned configuration is meant: helmet carrying compartment 11 and supply unit, in this embodiment the battery unit 15.

In particular, this shape allows to keep a helmet carrying compartment on an electric drive vehicle. The arrangement of the helmet carrying compartment and of the supply unit piled up with respect to the latter allows to optimize the space available in the shell body, by concentrating the weights only in the rear portion of the vehicle, near the ground.

Figure 3:
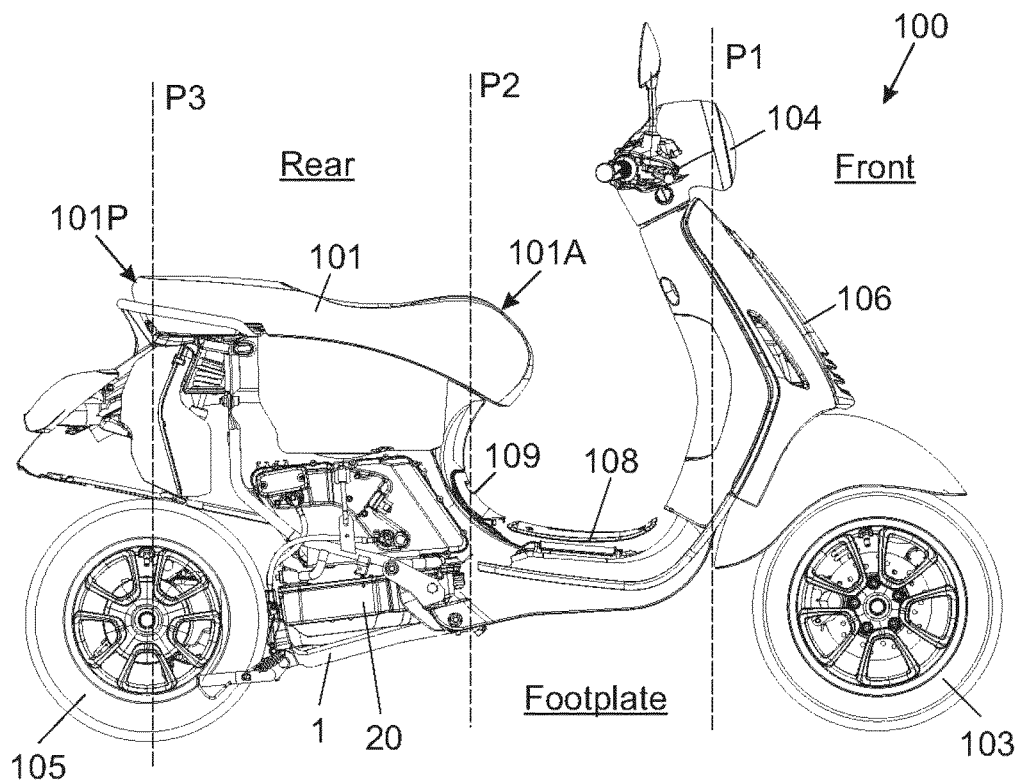
FIG. 3 shows a right-side view and in partial section of the electric drive motorcycle of FIG. 1.

In fact as shown in FIGS. 2 and 3, in the intermediate portion of the vehicle, wherein there is the resting footplate, there are no components of the supply unit, by improving the comfort for the driver.

However, it is possible to provide a piled-up configuration wherein the helmet carrying compartment and the supply unit are offset one to another (not illustrated).

It is to be noted that, in particular, the helmet carrying compartment 11 is overlapped to the battery unit 15 and substantially covers it (FIGS. 6 and 7). The battery unit 15 in turn is above the space limited by the rear fork 1. To this regard, the casing 16 of the battery unit 15 can rest onto a tray 19 integral to the frame and on the upper portion it can be anchored to the frame by means of a stirrup 17 and tie rods 18.

Figure 10:
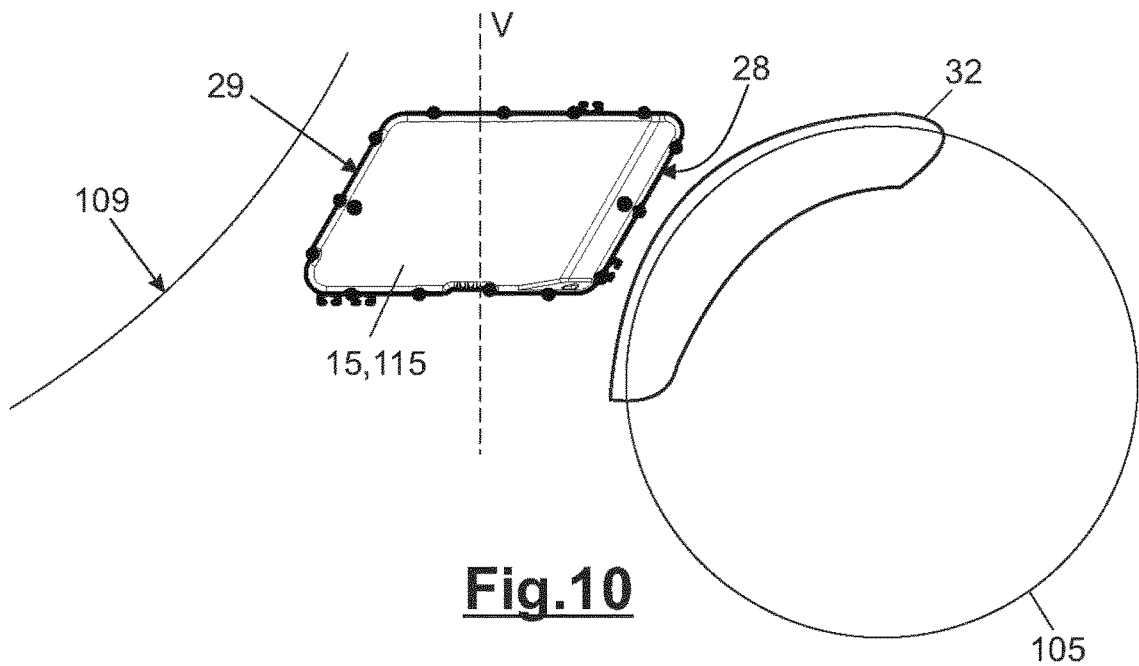
FIG. 10 shows a first side view of the battery pack of FIG. 9 and a schematized view of the wheel and of a shell portion.
Figure 11:
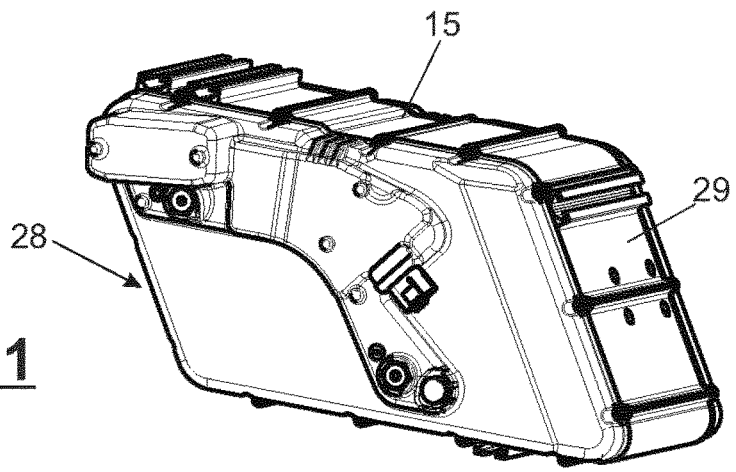
FIG. 11 shows a second side view of the battery pack of FIG. 9.

In this configuration, the battery unit 15 extends transversally in said housing space 111 from a side to the other one. In particular, the battery unit 15, and more in particular the outer casing 16, is shaped so as to have a polyhedral shape comprising at least a first tilted side 28 with respect to a vertical plane V and orthogonal to the front-rear direction of the motorcycle (FIG. 10).

The first tilted side is the rear side 28 facing to the rear wheel 105 and it is shaped so as to follow the shape of the wheel 105 itself.

In particular, the first side is adjacent to the upper portion of the wheel 105, therefore it is tilted with its top shifted in rear direction. In a preferred embodiment, the first tilted side is rectilinear, but it is meant that it can be even curved, with a course in agreement to that of the upper area of the wheel thereto such side is adjacent. In the rectilinear case, the first side can be parallel to a line tangent to the upper area of the wheel 105.

As it is better shown in FIGS. 9 to 12, the casing 16 of the battery unit 15 can include a second tilted side 29 opposite to the first tilted side 28 which is faced towards the intermediate portion of the motorcycle 100 and which results to be shaped so as to follow the profile shape of the shell body 107 in the area joining to said intermediate portion 108, that is substantially parallel to the front wall 109 (FIGS. 2, 3 and 4).

For a convenient symmetry reason, the first and second side 28, 29 can be parallel, so as the upper and lower, both horizontal, sides are. In this way, the longitudinal section of the battery unit 15 has parallelepiped, in particular rhomboidal shape.

The upper side 30 is horizontal, flat and adjacent to the bottom wall 12 of the helmet carrying compartment 11 arranged below the saddle 101. On the contrary, the lower side 31 is adjacent to the rear fork 1. Between battery unit 15 and rear wheel 105 a mudguard septum 32 is provided (schematized in FIG. 10).

The above-mentioned shape of the battery unit 15 allows to maximize the power of the battery unit depending upon the available space within the shell of the vehicle.

In particular, the tilted shape of the side walls 28, 29 of the battery unit allows to increase the space available in longitudinal direction, by keeping substantially unchanged the overall height defined in vertical direction.

Figure 12:
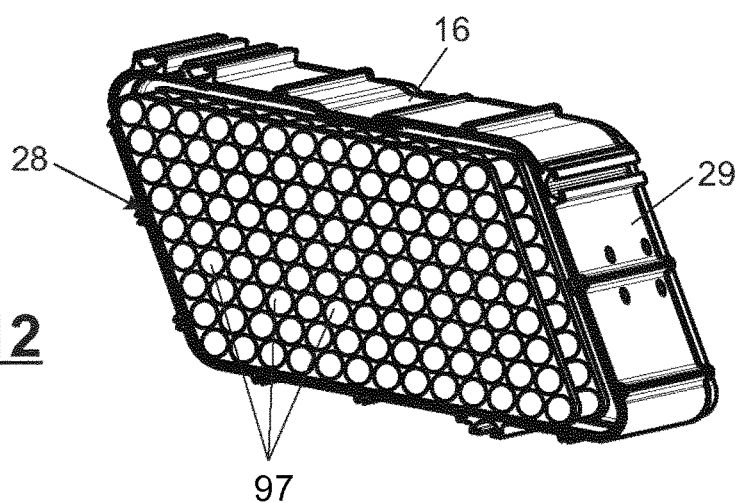
FIG. 12 shows a view in vertical longitudinal section of the battery pack of FIG. 9.

By referring to FIG. 12, the casing 16 seen in section has a parallelogram-like shape which allows to define a supplementary volume capable of housing additional battery cells, with respect to the conventional rectangular shape of a battery.

Advantageously, a side wall of the container 16 of the battery unit can be of removable type, for extracting and in case replacing, regenerating or disposing the inner battery elements. The battery unit in turn can be extracted according to a longitudinal direction or, according to a variant, according to a vertical direction.

It is to be noted that the shell body 107 and the battery unit 15 are configured so as to allow the extraction of the battery unit through an opening of the shell body 107 wherein the helmet carrying compartment 11 results to be able to be positioned. Alternatively, the shell body 107 and the battery unit 15 are configured so as to allow the extraction of the battery unit 15 through a front opening of the shell body 107.

The motorcycle 100, according to the present invention, further comprises a VMS (Vehicle Monitoring System) control unit comprising several electric/electrical components arranged inside a container 20, in particular a metal container with box-like shape, which is positioned below the battery unit 15, to define, in the order, a piled-up arrangement seeing from top to bottom: the saddle 101 and the related helmet carrying compartment 11, the battery unit 15 and the control unit arranged to control the drive unit and the battery unit (FIGS. 6 and 7).

Figure 8:
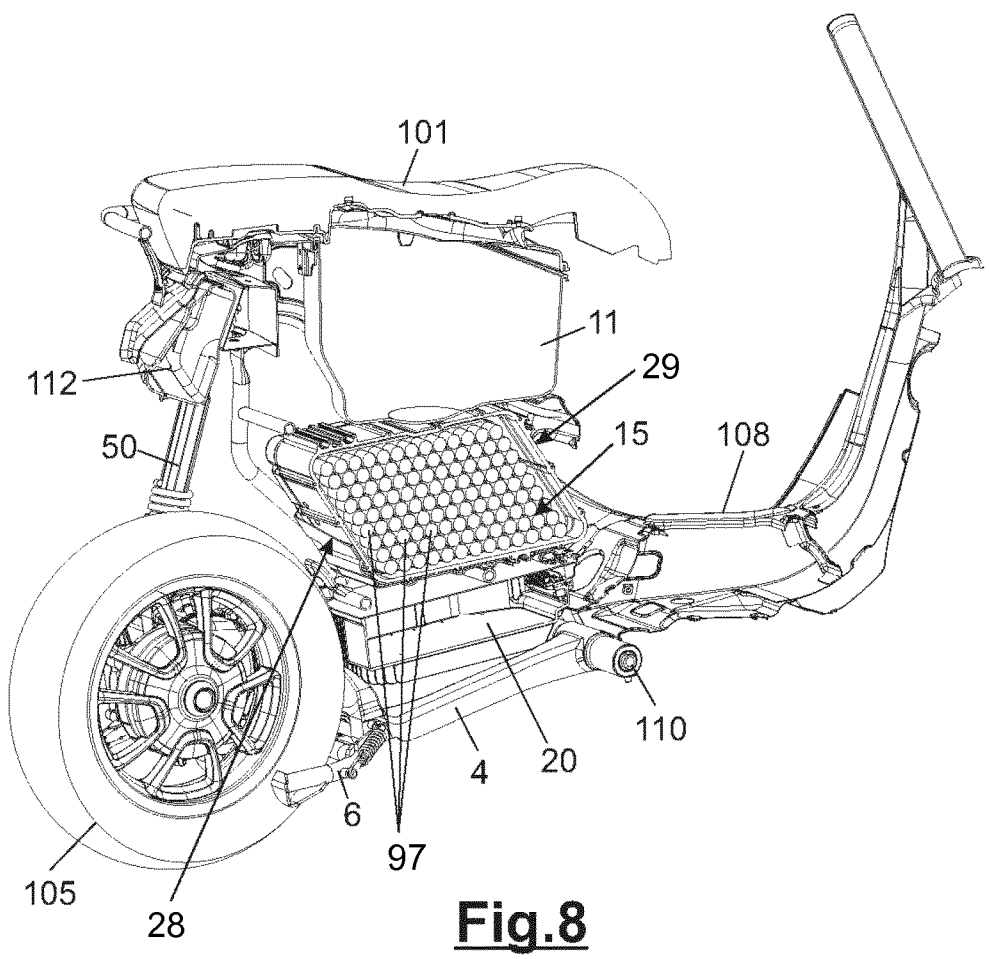
FIG. 8 shows a perspective view and in section, according to a longitudinal vertical plane, of the rear portion of FIG. 5.
Figure 9:
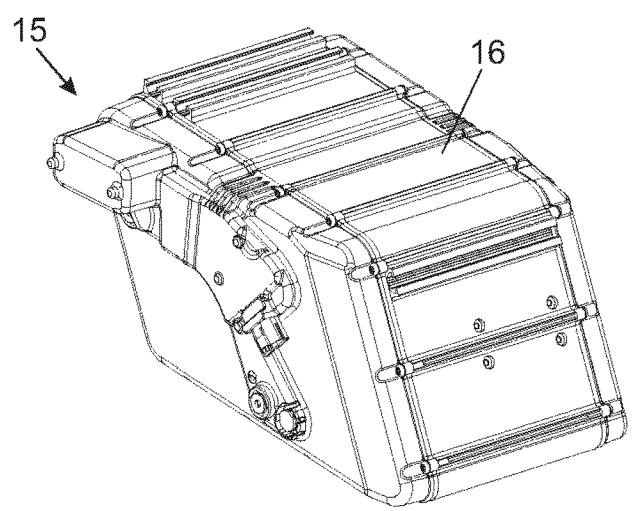
FIG. 9 shows a perspective view of a battery pack of the electric drive motorcycle of FIGS. 1 to 8.
Figure 13:
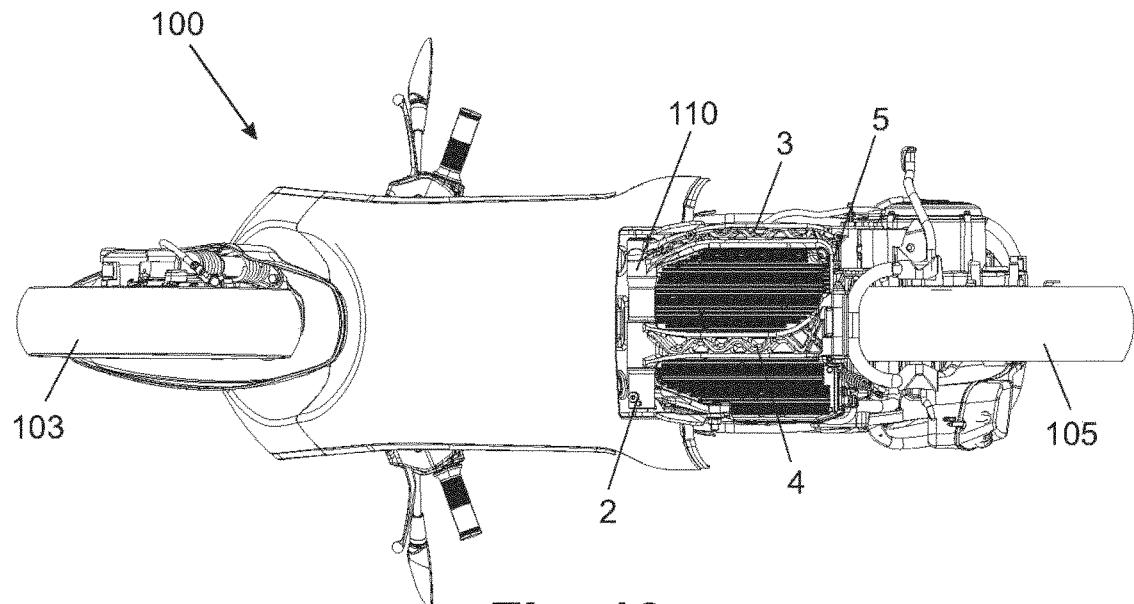
FIG. 13 shows a bottom plan view of the electric drive motorcycle of FIG. 1.
Figure 14:
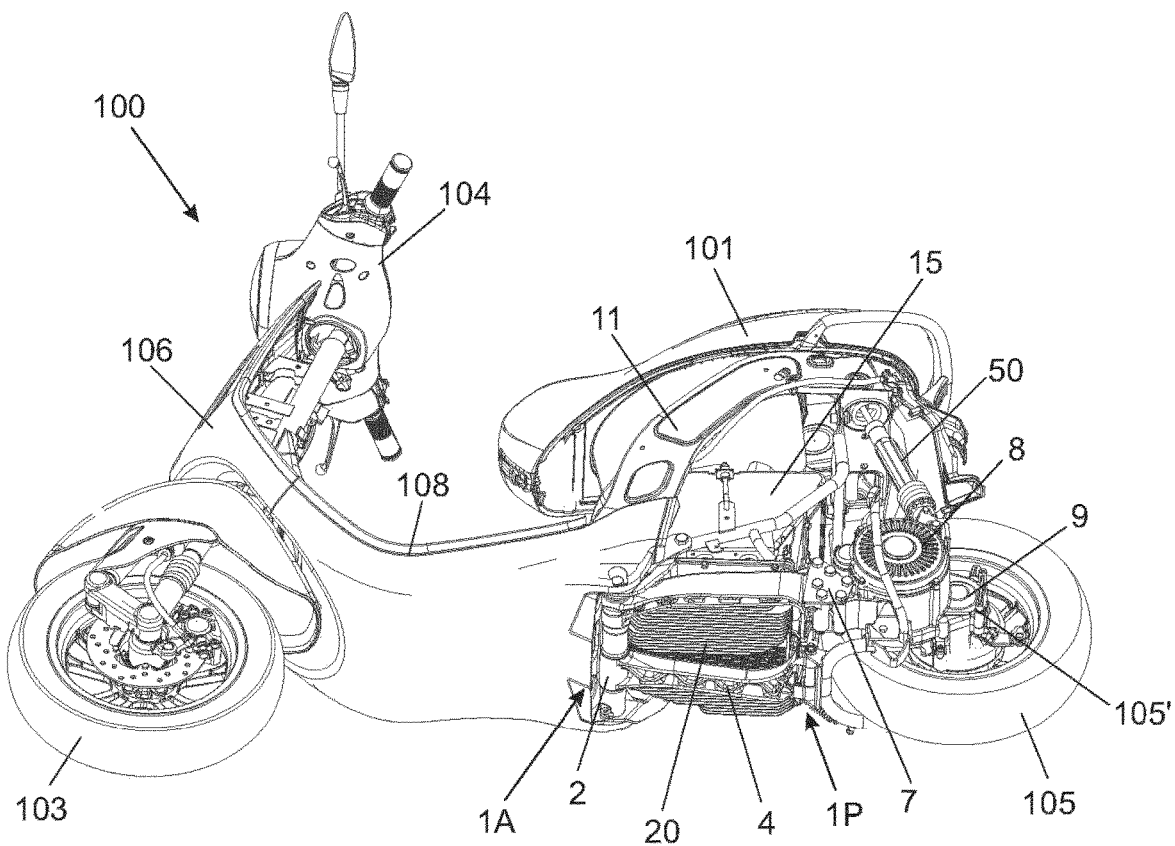
FIG. 14 shows a perspective bottom view and in partial section of the electric drive motorcycle of FIG. 13.

In particular, as shown in the partial section of FIG. 8, said container 20 is positioned exactly in the empty space limited by the rear fork 1. In this way, the rear fork 1, joined to the shell body 107 by means of a hinge 110, comprises at least a fork arm 3, 4, extending between the shell body 107 and the drive unit, placed side by side the container 20 (FIGS. 13 and 14).

Figure 5:
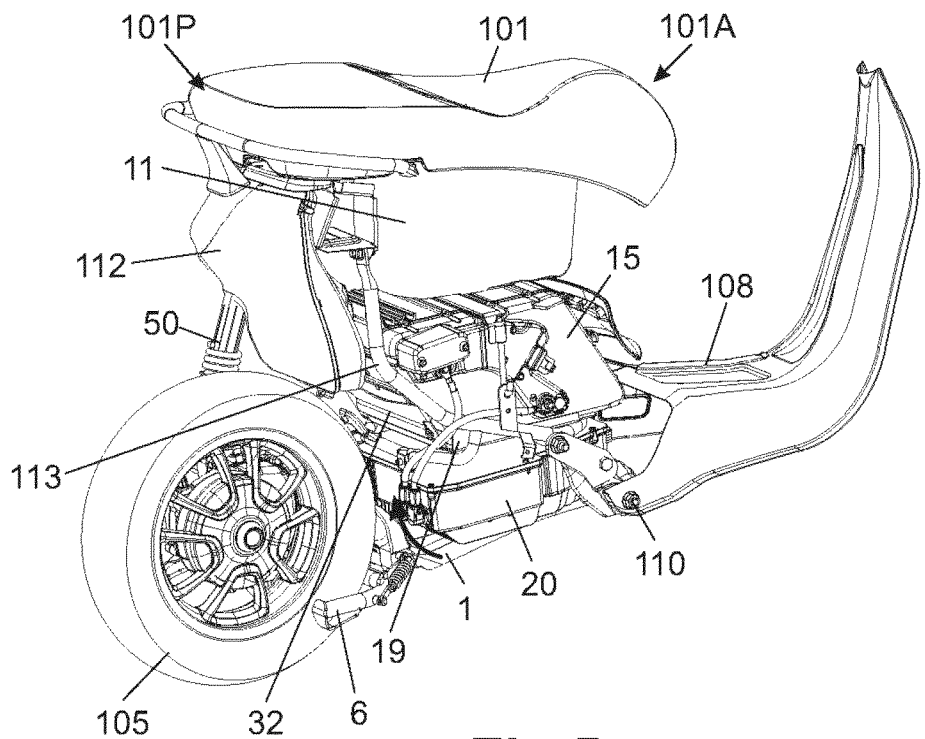
FIG. 5 shows a perspective view of an enlargement of a detail of the rear portion of FIG. 4.

At least a fork arm 3, 4 wraps at least partially the container 20 of the VMS control unit during the swinging motion thereof with respect to the shell body, as shown in FIGS. 4 and 5.

The container 20 can be fastened to the frame 113, then integral to the shell body 107. Alternatively, it can be connected to the (not illustrated) battery unit 15.

Figure 28:
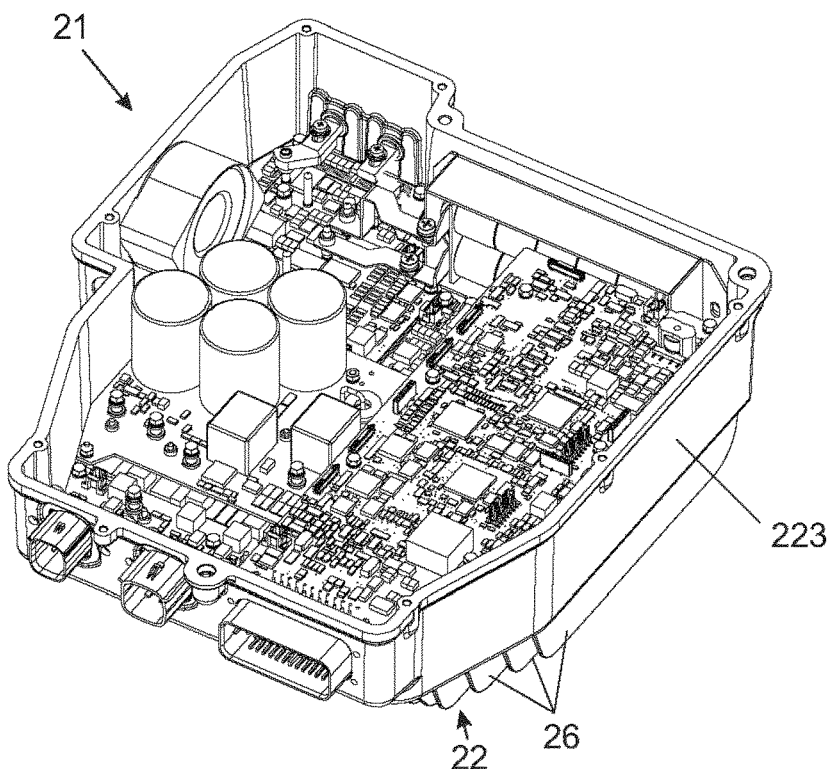
FIG. 28 shows a perspective top view of an open container for electronic components of the electric drive motorcycle of FIG. 1 or 15.
Figure 29:
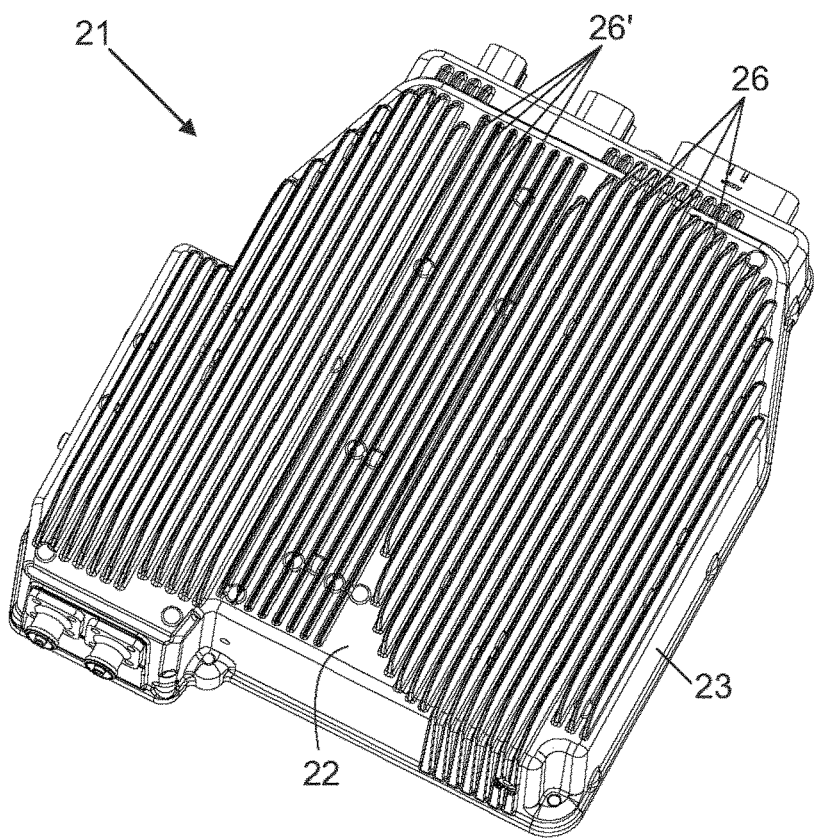
FIG. 29 shows an overturned perspective view of the open container for electronic components of the electric drive motorcycle of FIG. 1 or 15.

The container 20, as better illustrated in FIGS. 28 and 29, has a box-like body constituted by a lower tray 21, which has a lower wall 22 and side walls 23, and by an upper wall 24 acting as cover of the lower tray.

The upper wall 24, on its own outer surface, has a first connecting socket 25 faced, in use, upwards. The lower tray 21, on a side wall 23, which in the overall motorcycle is faced towards the rear wheel 105, has additional connecting sockets 27 to connect the control unit to the other electric and electronic components of the vehicle 100.

On the contrary, the lower wall 22 is directly faced to the ground. In particular, the lower wall 22 comprises a plurality of cooling fins 26, perpendicular to the lower wall 22 arranged according to a longitudinal direction parallel to a front-rear direction of the vehicle, that is the forward direction (FIGS. 13 and 14). The box-like body of the container 20 preferably is made of a high thermal conductivity material, for example an aluminium alloy.

The control unit, received in the lower tray 21, comprises power elements and control elements, and in particular the power elements are arranged resting upon the inner side of said lower wall 22 of the box-like body, with the purpose of increasing the disposal of the residual thermal energy.

It is to be noted that the position and the shape of the cooling fins 26 is so as to strengthen the lower wall 22, which could be struck by debris and roughness's of the ground.

In a first version, more clearly represented in FIGS. 13 and 14, the rear fork 1 is arranged near the area joining the intermediate portion and the rear portion, and it comprises: a first cross arm 2 connected to the hinge 110 which allows it to rotate in reply to the ground stresses, a second longitudinal arm 3 and a third intermediate longitudinal arm 4 arranged in a middle position with respect to said first cross arm 2, the third arm 4 is joined to a second cross arm 5, parallel and opposite to the first arm 2 arranged in proximity of the rear wheel 105. In a not illustrated variant, the third intermediate longitudinal arm 4 can be omitted.

In a second (not illustrated) version, the fork 1 can have a four-sided shape, formed by four arms or bars limiting a space inside thereof which surrounds the box-like body of the VMS control unit: at a first bar perpendicular to the forward direction and arranged near the footplate the rear fork has a hinge which allows it to rotate in reply to the ground stresses; a second bar is opposite to the first bar and it is then arranged near the rear wheel; a third and fourth bars arranged in a substantially longitudinal way which join the cross bars.

It is to be noted that the side bars 3, 4 which implement the arms of the rear fork 20 can have a polygonal section and they have a height which is substantially equal to the thickness of the stiff container 20, with the purpose of surrounding and covering it laterally at least partially.

The hinge 110 is fastened to the shell body 107 at the front wall 109 thereof so that the rear fork 1 could swing, that is rotate with respect to the hinge 110, with respect to the shell body 107 (FIGS. 4 and 5).

The fork 1 is free to rotate with a travel limited by a rear suspension 50 acting on the hub of the rear wheel 105; it comprises a spring and a heat sink, in particular a pneumatic damper assembled coaxially to the spring is provided, and it is connected to the shell 102 at a point arranged below the saddle 101. Moreover, a stand 6 can be revolvingly connected to the third bar 3 of the rear fork 1.

In a third (not illustrated) version, the fork 1 can include one single longitudinal arm configured for connecting the two bars perpendicular to the running direction and respectively connected to the electric motor and to the shell. In this version, the longitudinal arm is put side by side the container 20 and it keeps an open free side, by improving the air flow hitting the container 20 and then the cooling of the VMS system.

In this version (FIG. 29), the box-like body of the container 20 comprises an area which receives inside thereof the third cross arm, and which has fins 26' with lower height than the other fins 26, so that at least one side of the stiff container 20 is free.

In the above-described variants, the elastic constant of the spring of the rear suspension is calibrated so that the arms of the rear fork 1 and the stiff container are substantially parallel, in a configuration of maximum opening of the stiff container 20, when the motorcycle 100 sustains the weight, calculated based upon an average value, of the driver. In this way, the stiff container 20 of the control unit will be in a position of maximum protection when the vehicle is in use.

Figure 30:
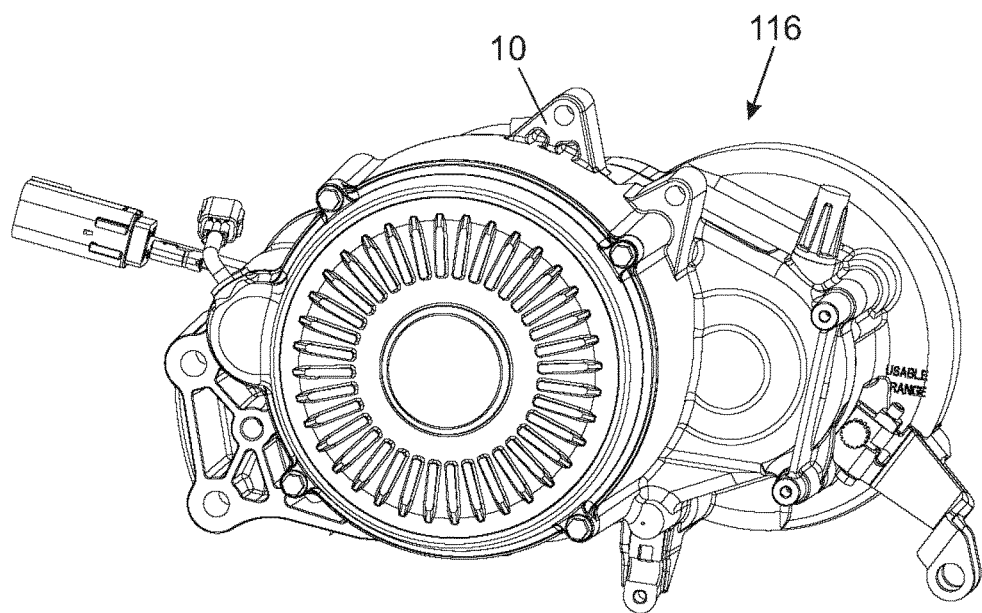
FIG. 30 shows a perspective view of an electric motor of the electric drive motorcycle of FIG. 1 or 15.
Figure 31:
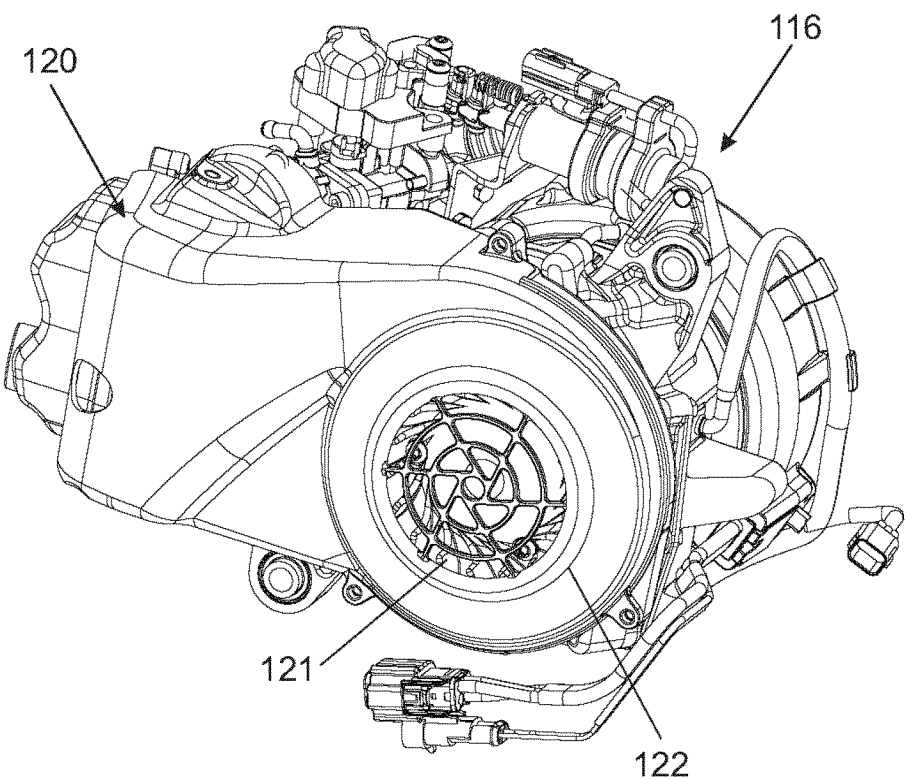
FIG. 31 shows a perspective view of a thermal engine of the electric drive motorcycle of hybrid type of FIG. 15.

As illustrated in FIGS. 13 and 14, at a rear end 1P of the fork 1 near the rear wheel 105 a first fastening plate 7 is provided thereto an electric motor 8 is connected, completed with a transmission unit, in particular a reduction unit 9, which provides to the wheel 105 the required propulsive push. Said rear wheel 105 results to be cantilever-like connected to said rear fork 1 by means of the electric motor 8. The armour of the electric motor 8 comprises on the upper side a second fastening plate 10 (FIG. 30) which is useful for the revolving connection to the other end of the rear suspension 50.

The motor 8 and the reducer, or transmission unit 9, constitute an electric drive unit connected to the rear wheel 105, respectively. The rear fork 1 and the drive unit are substantially aligned therebetween, according to the front-rear direction of the motorcycle.

In particular, the transmission unit 9 comprises a cascade of gears which connect functionally therebetween an outlet shaft 9' of the reducer 9 and the wheel hub 105', for producing a motor torque on the shaft of hub 105' of the rear wheel 105. In this way, by adopting a transmission system with gears arranged downwards the drive unit 8 it is possible to vary the transmission ratio by only varying the size of the gears. This allows to obtain a system which can be adopted depending upon the type of vehicle without having to modify the position or the shape of other portions of the vehicle. In fact, for example it is possible to vary the transmission ratio depending upon the change in the motor torque and the diameter of the rear wheel.

A second embodiment of motorcycle according to the present invention, in a version which provides a hybrid supply unit 115,120, will be now described, by referring to FIGS. 15 to 27. Hereinafter, portions identical or analogous to those described for the first embodiment will be designated with the same reference numeral.

All technical features described for the first embodiment can be applied even to the second embodiment, unless otherwise instructed. In particular, according to such variant, the motorcycle of FIG. 1 is an electric motorcycle of the hybrid called type, the traction thereof is guaranteed by the energy stored in a battery which feeds an electric motor and which can be recharged both by connecting it to an electric energy source and/or to a suitable mains-supply unit with a standard socket, and by means of a motor generator, that is a thermal engine, which actuates an electric generator arranged for recharging the battery unit and/or for feeding said drive unit.

Figure 15:
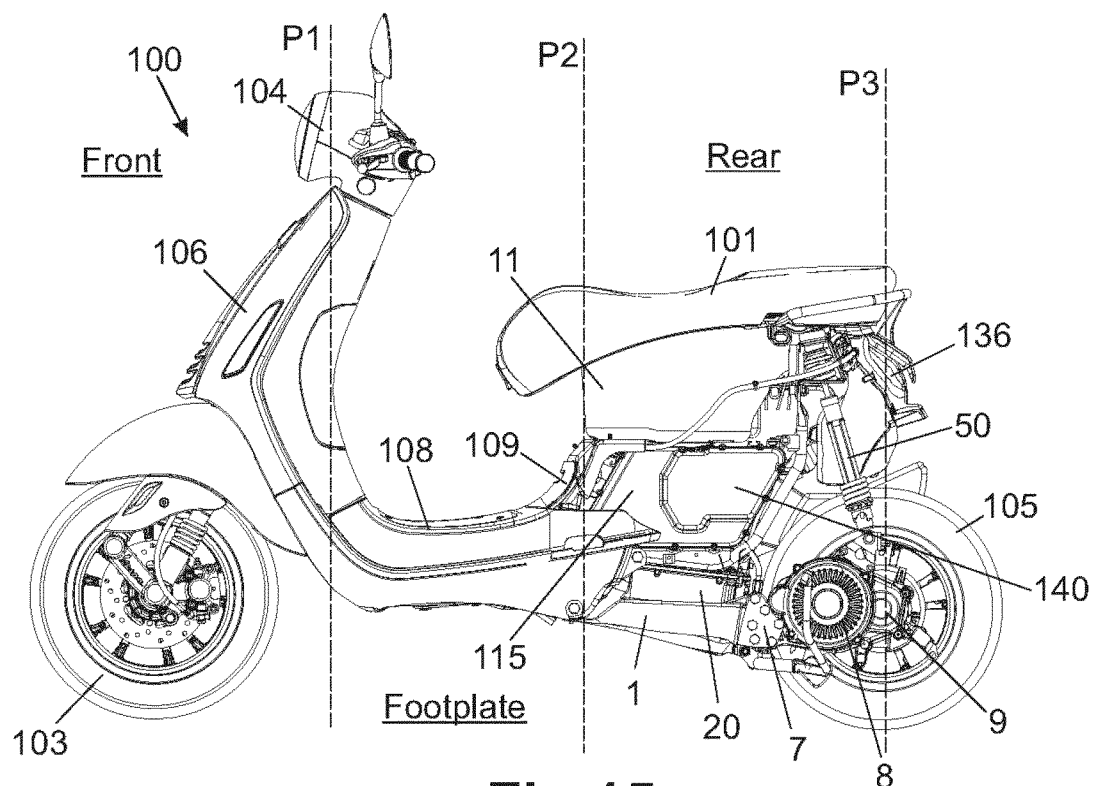
FIG. 15 shows a left side view and in partial section of an electric drive motorcycle of hybrid type.

Even for the second version, by referring to FIG. 15, as in the preceding embodiment, the scooter 100 is substantially divided into three portions in longitudinal direction: a front portion including the front wheel 103 and the handlebar 104 joined by a front fork which has a front suspension, with a front shield 106 which protects the legs and at least partially the bust of the driver sitting on the saddle 101; a rear portion including the saddle 101, the rear wheel 105 and a shell body 107 enclosing inside thereof the drive, control, electric energy storing elements, as well as a rear suspension; and an intermediate portion or footplate 108 joining front portion and rear portion, that is the front shield 106 and the shell body 107, with a substantially flat support, whereupon the driver rests his/her feet. In a particular not illustrated version of the motorcycle, the front portion can include two front wheels connected therebetween and to the frame by means of a steering four-bar linkage.

Moreover, the motorcycle 100 has a rear fork 1 which is substantially identical to the one described previously, and which can have the same variants mentioned above.

Analogously to what previously described, the motor 8 and the reducer 9 constitute an electric drive unit connected to the rear wheel 105 and a transmission unit 9, respectively. The rear fork 1 and the drive unit 8 are substantially aligned therebetween.

Even in the hybrid case, the transmission unit comprises a cascade of gears apt to produce a motor torque on the hub shaft of the rear wheel.

As in the first embodiment, in the rear portion of the shell a helmet carrying compartment 11 is provided, substantially constituted by a container open at its own top, having a bottom 12, side walls 13, with shape so as to be able to adapt to include one or two helmets, and an upper opening 14 which is covered by the saddle 101 acting as revolving cap. The shape and the capacity are the same of the preceding, only electric, version.

In particular, there is a supporting frame 113, for example of the truss-like type, which defines the service compartment wherein the supply unit is arranged.

The supply unit, in the second embodiment, is of hybrid type and comprises at least a battery unit 15 and a thermal engine 116 feeding an electric generator 120 which is apt to feed the battery unit 115 or, in direct way, the electric drive unit 8. Additionally, an intermediate solution is possible, wherein a portion of the electric energy produced by the electric generator 120 is used for the traction in direct way and another portion, instead, is used for increasing the charge available in the battery unit.

In particular, the sum of the energy provided by the battery and/or by the electric generator is so as to allow a constant cruise speed when the accelerator is controlled so as to supply the maximum available power. This is implemented when:

1) the battery unit is wholly charged, and it is capable of supplying alone a power so as to guarantee a constant maximum cruise speed, 2) the battery unit is partially discharged, and the motor generator partially compensates the insufficient supply of electric current of the battery unit to guarantee said maximum constant cruise speed, and partially recharges the battery unit, 3) the battery unit is discharged, and the motor generator produces electric energy exclusively for the electric motor so as to guarantee said constant maximum cruise speed.

In each other situation, the motor generator recharges the battery and/or supplies energy to the electric motor when this is no more at maximum regime, according to the level of charge and of the power required for the electric motor.

Moreover, a control unit, the structure thereof is the same described above, implements a method for managing the supplied energy wherein two different speed regimes are substantially provided: a first speed wherein the accelerator is controlled at the end of travel, to determine the maximum possible cruise speed, and a second speed regime wherein the accelerator is controlled in an intermediate position between the end of travel (maximum available supplied energy) and the initial position, corresponding to null supplied energy.

According to such method, when the accelerator is controlled at the end of travel the energy supplied to the drive unit depends upon the charge state of the battery unit: if the battery unit is about to be discharged or is discharged, all energy which has to be supplied to obtain the maximum cruise speed is provided by the motor generator, whereas in case of lower speeds a quantity of generated energy will be used for recharging the battery unit.

On the contrary, when the battery unit is in a charged state, it can provide by itself the energy required to obtain the different speeds, by managing, whenever required, the acceleration peaks and the deceleration recovery.

Moreover, in advantageous way, the motorcycle 100 comprises a selector therewith a regime for managing the available energy can be selected by the driver wherein the motor generator is actuated to obtain a state of maximum charge of the battery unit, in view of a future use of the vehicle in only electric mode, for example in case of limitations to the not electric traffic.

The same selector, or an additional selector, can further allow the selection of a start&stop mode of the thermal engine 116. In this way, when the vehicle results to be still, for example at a traffic light, the thermal engine 116 stops, by consequently interrupting the production of electric current. When the vehicle is still and the thermal engine 116 is switched off, a new start of the motorcycle can be performed with the current of the battery unit only, as long as the thermal engine 116 does not switch on again.

The same selector can be used with the purpose of favouring the electric drive only with a limitation of the maximum obtainable speed, useful for example in urban areas, or to exploit at maximum the energy which can be provided by the motor generator, for example in an extra urban area.

Structurally this variant provides that the rear portion of the motorcycle 100 comprises the helmet carrying compartment 11, placed in a position below the saddle 101, whereas the hybrid supply unit, constituted by the combination of the battery unit 115 and of the thermal engine 116 with attached electric generator 120, is placed below the helmet carrying compartment 11 so that the saddle 101, the helmet carrying compartment 11 and the hybrid supply unit 115, 116, 120 are substantially arranged piled up therebetween in the shell body 107 in a substantially vertical pile, and wherein the helmet carrying compartment 11 towers above the whole hybrid supply unit.

This arrangement of the helmet carrying compartment and of the hybrid supply unit reaches the same advantages described for the variant with supply unit with batteries alone.

Figure 18:
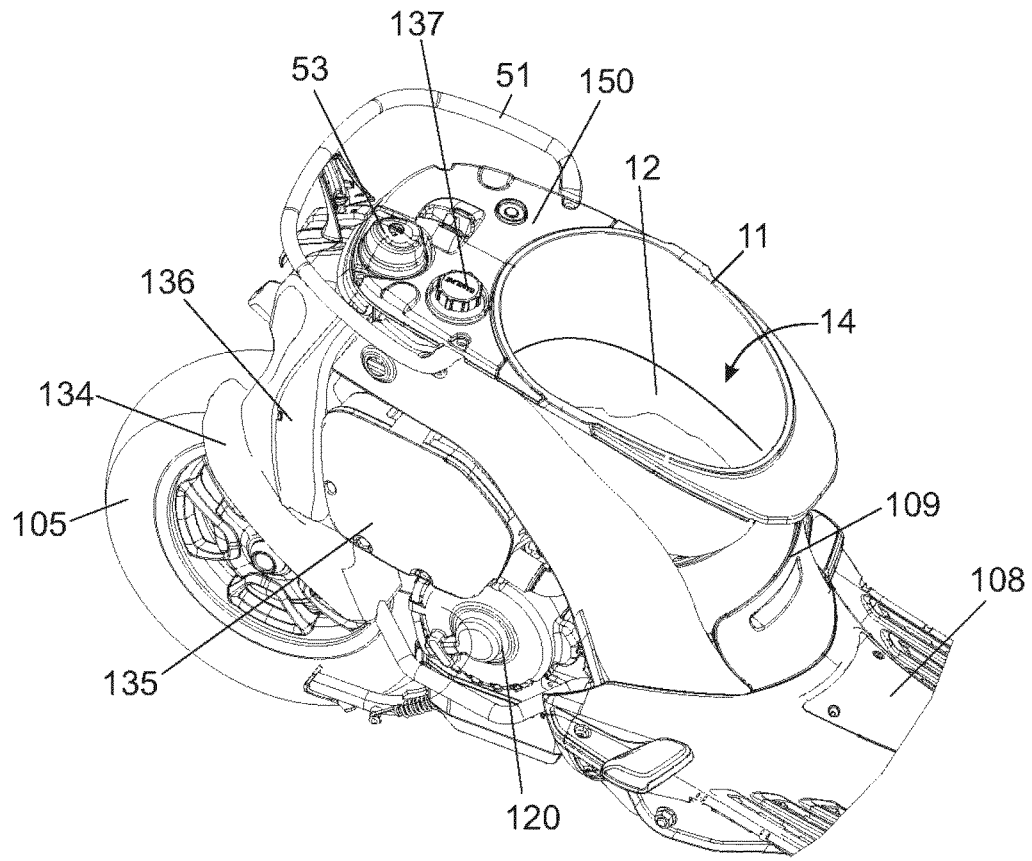
FIG. 18 shows a first perspective view of the rear portion of FIG. 17, wherein some outer elements are missing, to make visible the inner portions.
Figure 19:
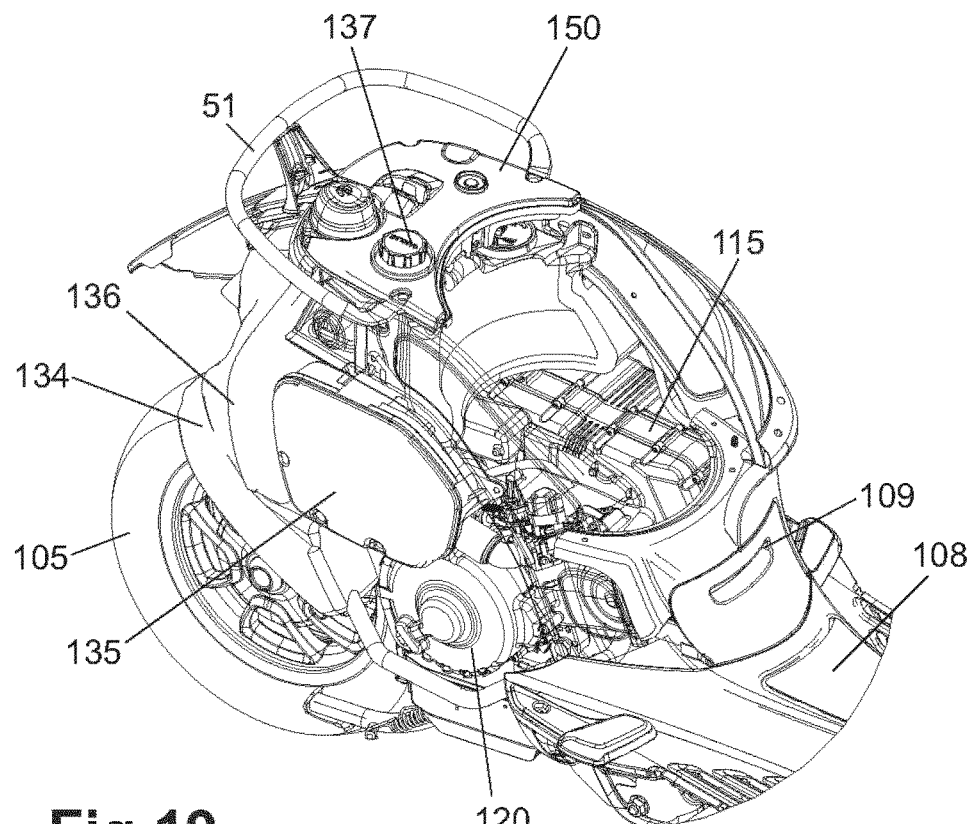
FIG. 19 shows a second perspective view of the rear portion of FIG. 17 wherein some outer elements are missing, to make visible the inner portions.
Figure 20:
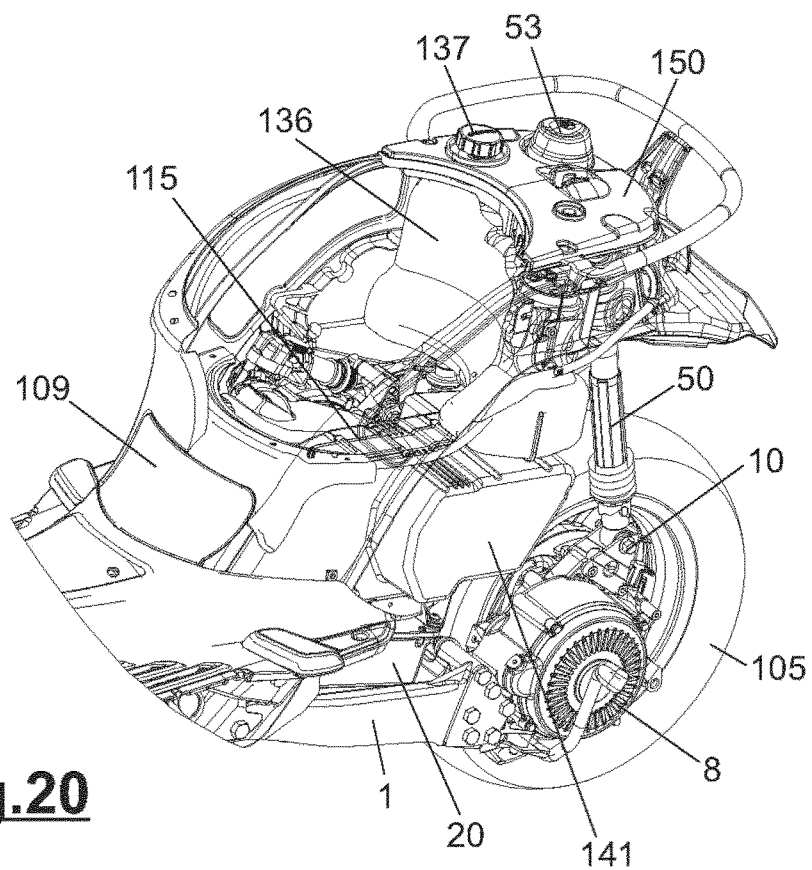
FIG. 20 shows a third perspective view of the rear portion of FIG. 17 wherein some outer elements are missing, to make visible the inner portions.
Figure 21:
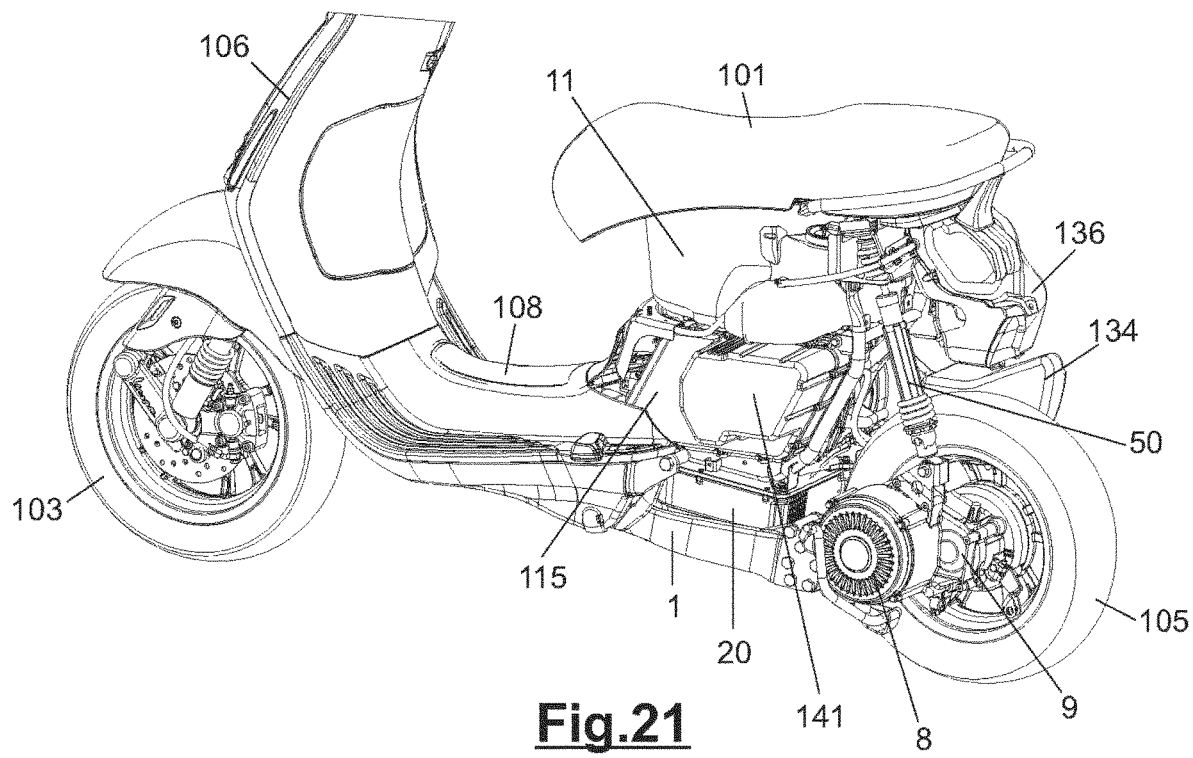
FIG. 21 shows a perspective side view of the motorcycle of FIG. 15 without showing the handlebar, wherein some outer elements are missing, to make visible the inner portions.
Figure 22:
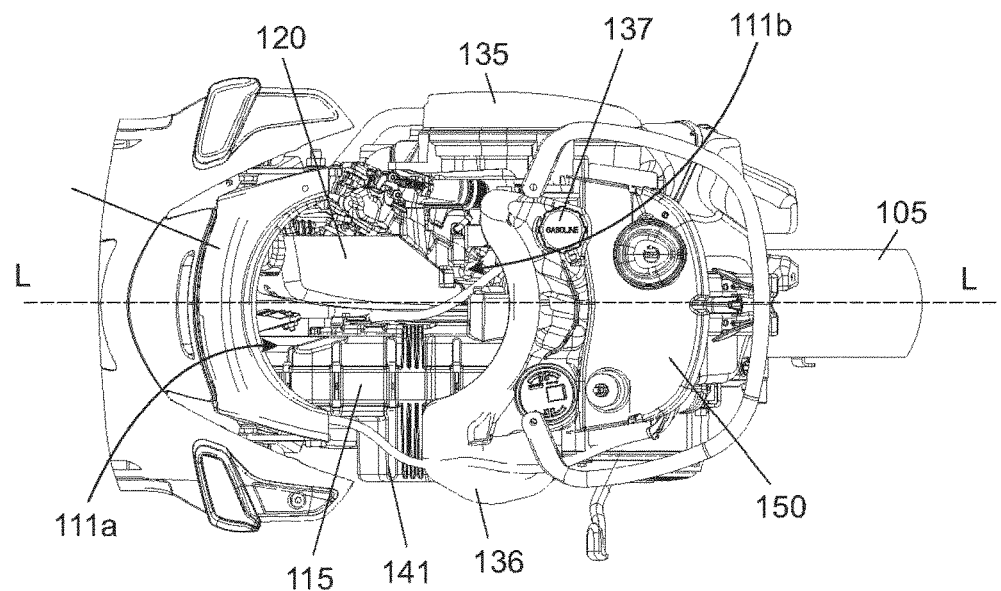
FIG. 22 shows a top plan view and in section according to a horizontal plane of the rear portion of FIG. 17 wherein some outer elements are missing, to make visible the inner portions.

By referring to FIGS. 18 a 25, the housing space which is limited laterally by the shell body 107 and on the upper portion by the bottom wall 12 of the helmet carrying compartment 11 comprises two distinct portions 111a and 111b. The first portion 111A is apt to receive the battery unit, designated with 115, and the second portion 111b to receive the motor generator 120 (FIG. 22). The two portions ideally are separated by a vertical plane L-L which is arranged longitudinally, according to a front-rear direction with respect to the motorcycle. The plane L-L can be oriented even in other directions. The thermal engine 116, the electric generator 120 and the battery unit 115 are arranged side by side below the helmet carrying compartment 11.

Figure 23:
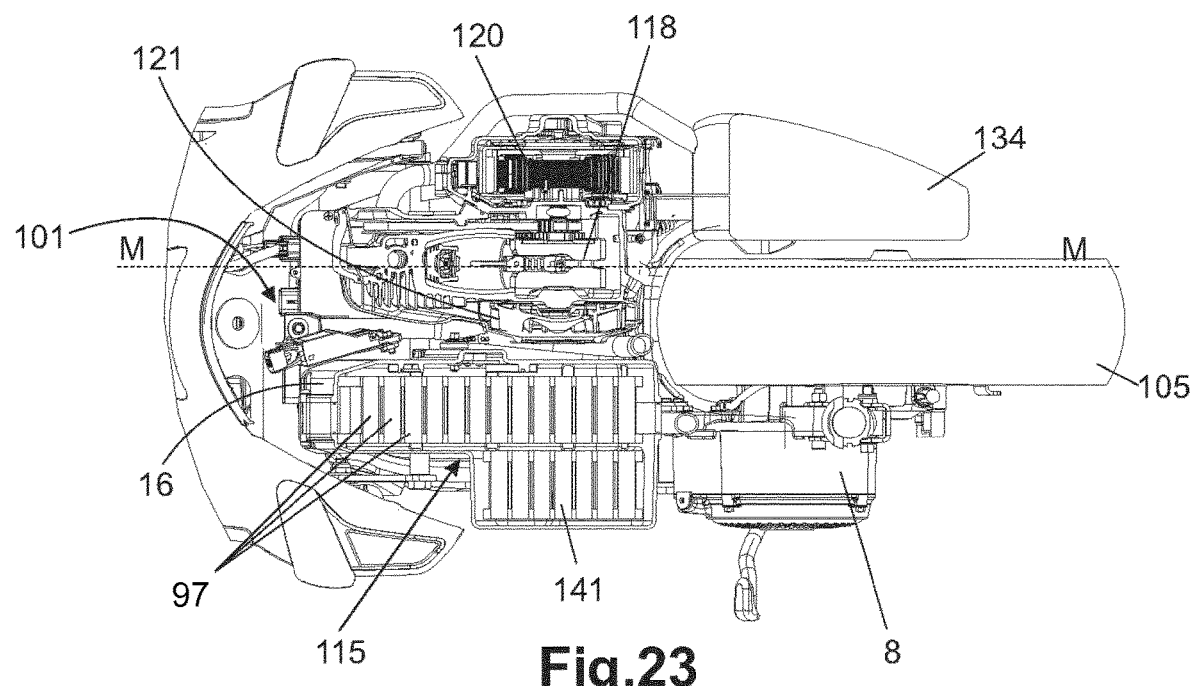
FIG. 23 shows a first section view according to a horizontal plane, illustrating the inside of the rear portion of FIG. 17.
Figure 24:
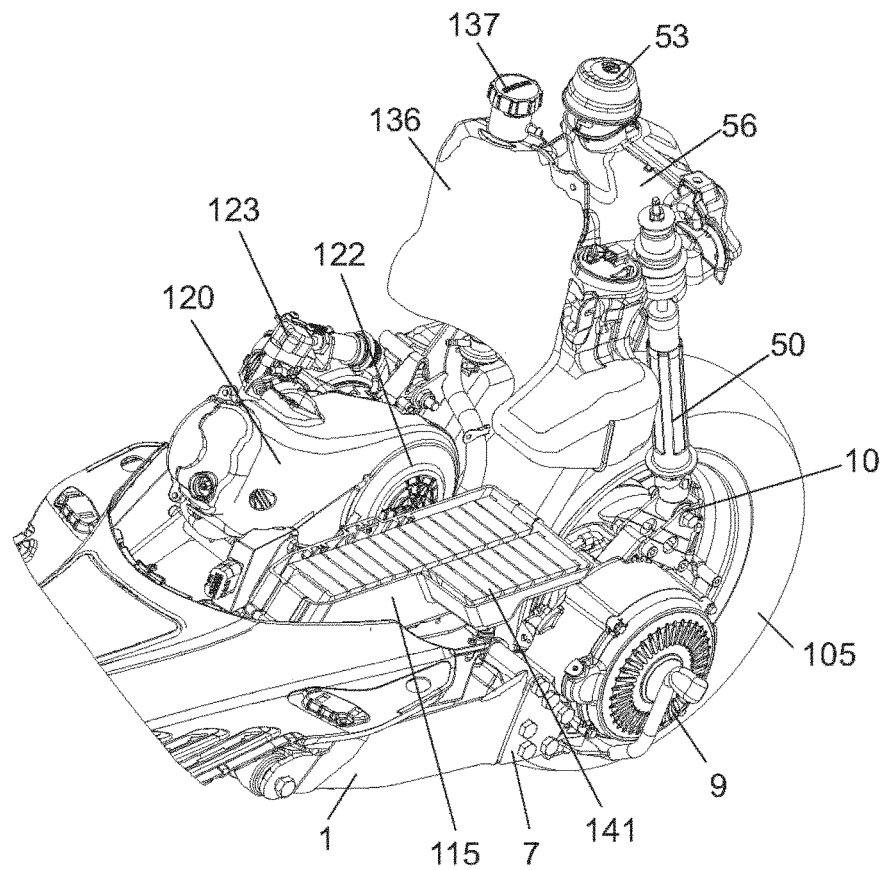
FIG. 24 shows a second perspective view in partial section, illustrating the inside of the rear portion of FIG. 17.

The thermal engine comprises a cooling device which comprises at least a fan 121 with a related suction orifice 122 (FIGS. 23 and 24).

In the present embodiment, the thermal engine 116 is constituted by an alternated combustion engine with controlled switching-on, in particular single-cylinder engine, that is comprising one single cylinder with a single piston. Alternatively, a multi-cylinder, for example two-cylinder, thermal engine can be provided.

In the single-cylinder version, preferably the cylinder is arranged substantially horizontally, with the head 117 (FIG. 19) facing towards the direction of the front portion of the motorcycle 100 and an engine block 118 which extends longitudinally, with an axis M-M substantially parallel to a front-rear direction of the motorcycle (FIG. 23).

The thermal engine 116 comprises a driving axle (not shown in detail) which, by the effect of the geometry described previously, is arranged transversally to said front-rear direction M-M, and it is placed horizontally to the housing space 111.

The driving axle has a first end keyed to an electric generator 120 of conventional type; the latter is arranged on a first outer side of the housing space, adjacent to the wall of the shell body 107. The shaft has also a second end thereto the suction fan 121 is keyed, inserted in a fan casing.

The fan 121 then is arranged substantially in the centre of the housing space 111, adjacent to the battery unit 115. The fan 121 is of centrifugal type and it sucks an air flow in axial direction, that is parallel to the actuation axis of the fan 121, which is then directed radially in the space which includes the engine block and the electric generator 120.

In particular, the cooling fan 121 comprises a suction orifice 122 faced towards the battery unit 115 (FIG. 24).

In this way, the air flow is sucked through the battery unit 115 which is hit and refrigerated by the air sucked by the fan 121.

This arrangement can guarantee an optimum refrigeration both of the battery unit 115 and of the motor generator 120, by using one single fan keyed directly to the driving axle, so as to reduce to the minimum the number of components.

The thermal engine 116 described previously comprises a discharge duct 133 (FIGS. 16 to 18) which comprises a tubular expansion chamber 134, provided with a catalyst device and a discharge nozzle.

Figure 16:
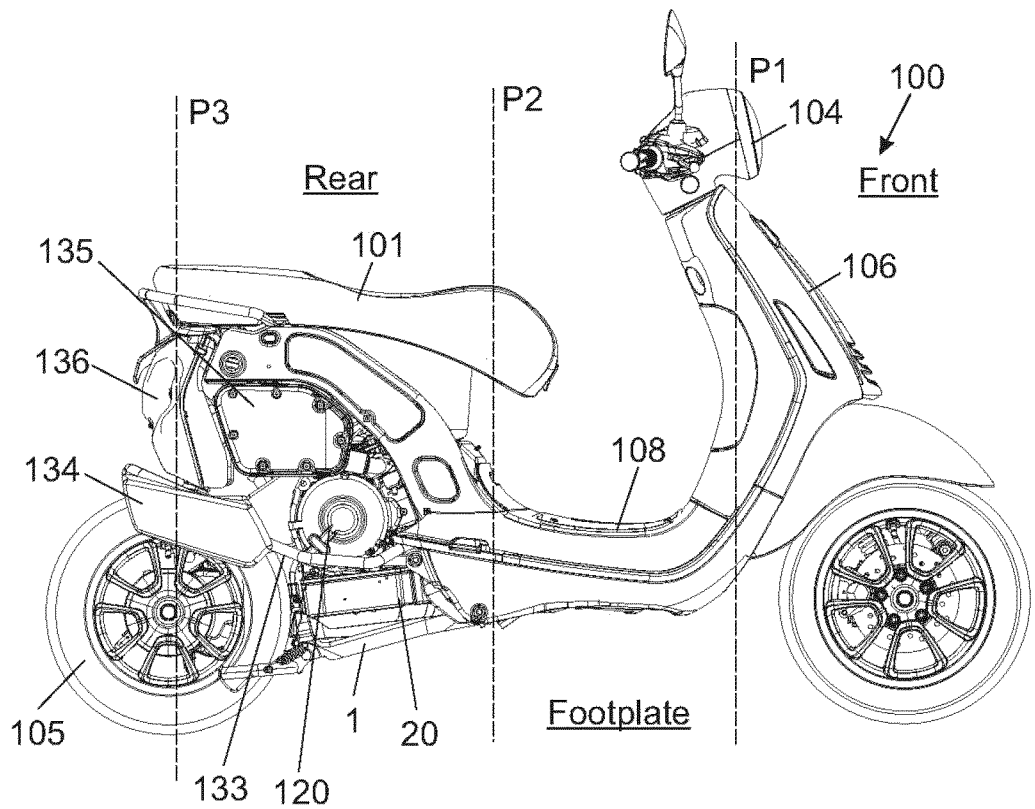
FIG. 16 shows a right-side view and in partial section of the electric drive hybrid motorcycle of FIG. 15.
Figure 17:
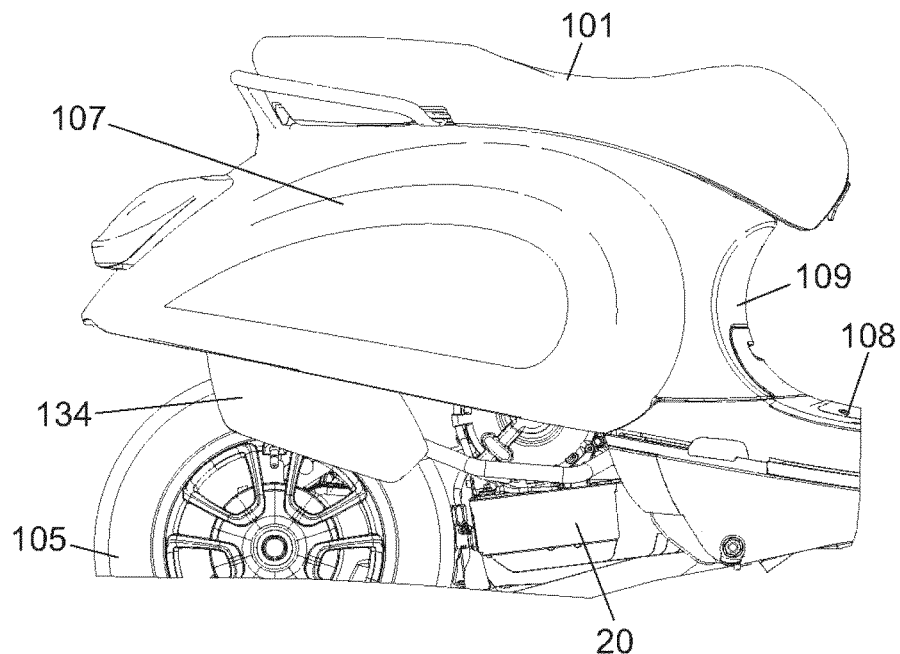
FIG. 17 shows a partial side view of a rear portion of the motorcycle of FIG. 15, including the saddle and the rear shell.

The expansion chamber 134 is arranged in a substantially conventional position, on the side of the rear wheel 105 with respect to the electric drive unit 8. The discharge duct 133 then extends from the head 117 of the engine as far as the rear end of the motorcycle 100, passing below the electric generator 120 (FIG. 16).

The thermal engine 116 is also supplied with air through a filter 135 and a throttle body of conventional type, not shown in detail. The filter 135 is positioned inside a box of the air filter, with flattened box-like shape, arranged vertically adjacent to the shell body 107, on the side of the vehicle wherein there is the electric generator 120. In particular, the filter box 135 is positioned on the same side of the discharge duct 133. In particular, the filter is arranged above the discharge duct 133.

In this embodiment, the filter 135 is arranged on the upper side with respect to the electric generator 120 and to the expansion chamber 134, thus obtaining an optimization of the available space.

In other words, the filter box is positioned above the discharge duct 133, 134, in particular the expansion chamber 134. The filter box 135 and the discharge duct 133, 134 are arranged on the side opposite to the battery unit.

In other structural detail aspects, aimed at optimizing the space, the filter box 135 comprises a portion 135' which embraces an angular sector of the generator 120 (FIG. 16).

Moreover, the thermal engine 116 is fed by fuel included in a suitable tank 136. The tank is shaped so as to surround partially the side walls of the helmet carrying compartment 11, so as to have an upper end arranged near the saddle 101, with a refuelling nozzle closed by a cover of the fuel 137, projecting from the service surface 150 of the shell body 107 covered by the saddle 101 (FIG. 24). The tank 136, in turn, is above the battery unit 115.

The battery unit 115, as shown in FIGS. 25, 26, 27, is constituted by a battery pack constituted by a battery casing 16 and by a plurality of battery cells 97 inserted inside the casing 16.

It is arranged in a position below said helmet carrying compartment 11, adjacent to the thermal engine as previously described (FIG. 22).

Both the battery unit 115 and the motor generator 120 are above the space limited by the rear fork 1. In this configuration, the battery unit 115 extends transversally in its own portion of the housing space 111a, by occupying it substantially from one portion to the other one. It is shaped so as to have a polyhedral shape comprising at least a first tilted side 28 with respect to a vertical plane orthogonal to the front-rear direction of the motorcycle (FIGS. 25-27).

The first tilted side 28 can be the rear side which is faced towards the rear wheel 105, so as to follow the shape of the wheel 105, that is to adapt as tilting to the space surrounding the rear wheel 105. In particular, the first side is adjacent to the upper portion of the wheel 105, therefore it is tilted with the top thereof shifted in rear direction. Such side is rectilinear, but it is meant that it could be even curved, with a course in agreement to that of the upper area of the wheel thereto such side is adjacent. In the rectilinear case, the side is substantially parallel to a line tangent to the upper area of the wheel.

The casing 16 of the battery unit 115 comprises a second tilted side 29 opposed to the first tilted side 28 which is faced towards the intermediate portion of the motorcycle 100 and which results to be shaped so as to follow the profile shape of the shell body 107 in the area joining with the intermediate portion 108, that is substantially parallel to the front wall 109.

For a convenient symmetry reason, first and second side 28, 29 can be parallel, as well as the upper and lower sides can be both horizontal. In this way, the longitudinal section of the battery unit 115 can have parallelepiped shape.

The upper side 30 is horizontal, flat and adjacent to the bottom wall 12 of the helmet carrying compartment 11 arranged below the saddle 101. On the contrary, the lower side 31 is adjacent to the rear fork 1. A mudguard septum 32 is arranged between battery unit 115 and rear wheel 105.

Considering the reduced space at disposal, at its own side walls, the container 16 of the battery unit 115 can have projections 140 and 141 to optimize the volume available for the inner batteries. They are placed in spaces left empty by the motor, by the fan and by the fuel tank. In particular, the projections 140, 141 extend in cross direction with respect to the longitudinal plane.

Advantageously, the projection 141 allows a greater volume and the use of a greater number of battery cells.

It is to be noted that a side wall of the container 16 of the battery unit can be of removable type, for extracting and in case replacing, regenerating or disposing the inner battery elements. Even in this second embodiment, the battery unit can be of the type which can be removed from the motorcycle.

The shell body 107 and the battery unit 15 are configured so as to allow the extraction of the battery unit through an opening of the shell body 107 wherein the helmet carrying compartment 11 results to be able to be positioned. Alternatively, the shell body 107 and the battery unit 15 are configured to allow the extraction of the battery unit 15 through a front opening of the shell body 107.

The motorcycle 100 comprises the control unit comprising several electric/electronic components arranged inside a container 20 which is positioned below the power supply unit, then below the helmet carrying compartment 11 and the saddle 101; the control unit is arranged to control the drive unit, the battery unit and the motor generator. Alternatively, said control unit is configured to control the drive unit and the battery unit. Said control unit communicates with an additional central unit for controlling the motor of the motor generator.

In particular, the container 20 of the control unit of this embodiment with motor generator is identical to the one described previously, and it is arranged in the same way with respect to the rear fork 1.

By referring to FIGS. 32 to 35, the arrangement of the feeder cable of the battery units is described hereinafter.

The saddle 101, when it is shifted, leaves uncovered the access opening 14 of the helmet carrying compartment and a flat service surface 150, arranged on the rear side of the access opening 14 and surrounded by the handle of the passenger 51 anchored to the shell body 107 (FIG. 18).

Figure 32:
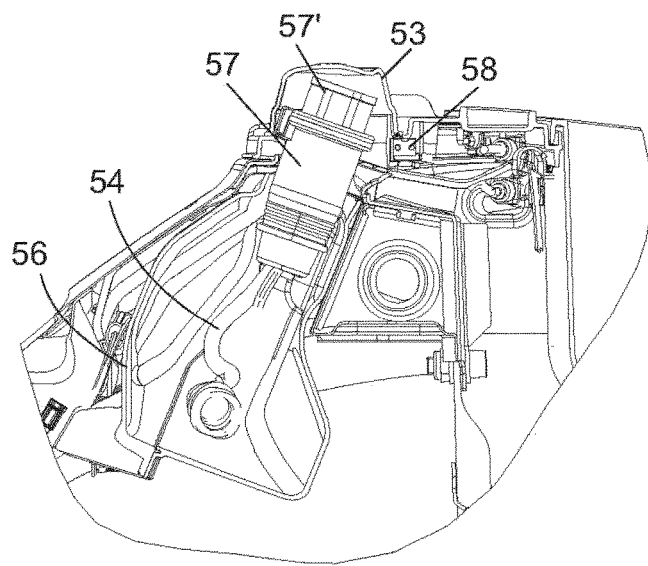
FIG. 32 shows a partial side view in section of the rear portion of FIG. 22, according to the plane A-A shown in such figure.
Figure 33:
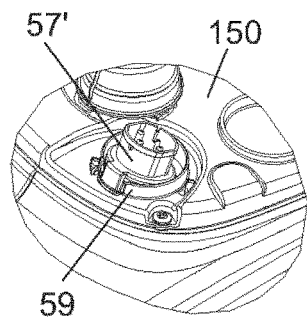
FIG. 33 shows a partial perspective view highlighting a detail of the rear portion of FIG. 22, in a first uncovered configuration.
Figure 35:
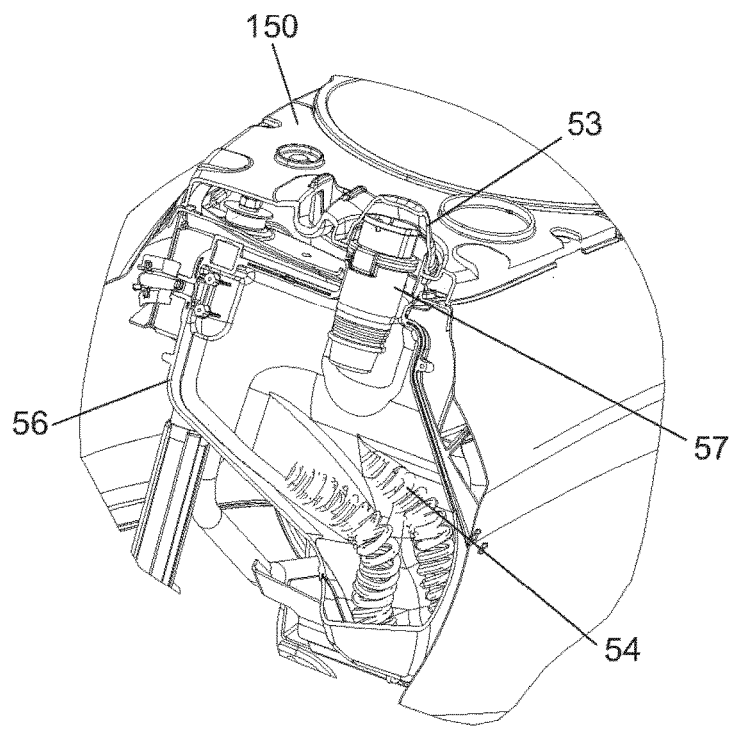
FIG. 35 shows a perspective view in partial section of a portion of the rear portion of FIG. 22, with the details of FIGS. 32 to 34.
Figure 34:
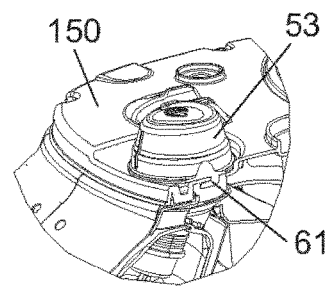
FIG. 34 shows a partial perspective view highlighting a detail of the rear portion of FIG. 22, in a second covered configuration.

The service surface 150 also comprises a cap 53 which covers an access hole 58 of the service surface 50 therethrough a feeder cable 54 is made to pass (FIG. 32).

It is a cable of helical type, which is then suitable to be lengthened elastically and to re-assume, when not stressed, a retracted configuration. At a distal end thereof, it is connected to an electric connection arranged inside a compartment of the feeder cable 56 which is arranged below the service surface 150.

In retracted configuration, the feeder cable 54 is wholly included in its intended compartment 56; the latter has an irregular shape which adapts to the space available at the rear wall of the helmet carrying compartment and of the rear wall of the shell body 107: the helical cable 54 is able to adapt to such irregular shape.

At a proximal end thereof, the feeder cable 54 has a connecting socket 57 of standardized type, it is arranged outside the access hole 58 which has a diameter so as not to allow the socket 57 falling in the feeder cable compartment.

On the contrary, at such access hole a seat 59 of the connecting socket 57 is formed wherein it is placed again in rest position, which allows the socket to project as little as possible so that it is possible to cover it with the cap 53.

The latter is fastened to the service surface thanks to a bayonet-like connection 61, which arranges it in the lowest possible position.

In this way, only when the connecting socket 57 is in its seat 59 in retracted position and when the cap 53 is correctly positioned and fastened to cover the socket 57 the complete closure of the saddle 101 on the service surface 150 is possible.

In the seat 59, and in particular at said bayonet-like connection, there is a sensor, in particular a proximity sensor or microswitch on the portions of cap 53 and of seat 59 which fit in one another in the bayonet-like connection, which detects the correct rest positioning of the connecting socket 57 in its seat 59 and which provides, to the control unit 100, a signal in presence thereof the start of the vehicle is allowed.

On the contrary, should the feeder cable be not retracted in its seat, and even should it still be connected to a supply source, the sensor would inhibit the start of the vehicle.

For safety, the closing of the saddle 101 can be completed only thanks to the fact of having a particular closure key, by way of anti-theft device.

To the above-described electric drive motorcycle a person skilled in the art, with the purpose of satisfying additional and contingent needs, could introduce several additional modifications and variants, however all comprised within the protective scope of the present invention, as defined by the enclosed claims.

The invention claimed is:

1. An electric traction motorcycle, comprising:
   a front portion which includes one or more front wheels and a handlebar;
   a rear portion which includes a saddle, a shell body arranged below said saddle, and a rear wheel arranged below said shell body;
   an intermediate portion extending as a connection between said front portion and said rear portion;
   an electric drive unit connected to said rear wheel and operable to drive said rear wheel;
   a power supply unit adapted to supply energy to said electric drive unit;
   a helmet carrying compartment, located inside the shell body below the saddle, and having a helmet opening which is covered by the saddle when the saddle is in a closed position,
   wherein in an open position, the saddle uncovers the helmet opening and a service surface, a power lead cable compartment being disposed below said service surface, the power lead cable compartment configured to enclose a power lead cable which, when retracted to be enclosed within the power lead cable compartment, allows the saddle to be disposed in a closed position, said cable being wholly included in said power lead cable compartment;
   said power lead cable compartment has a shape adapted to a space available at a rear wall of the helmet carrying compartment and of a rear wall of the shell body, the power lead cable having a connecting socket and a respective seat wherein it is placed in a resting position, and
   wherein a sensor for sensing the connecting socket in the resting position and provides a control signal representative of whether the connecting socket is in the resting position.

2. The electric traction motorcycle of claim 1, further comprising:
   a control unit which controls operation of the electric drive unit,
   wherein the control unit is connected to the sensor for sensing the connecting socket in the resting position and inhibits operation of the electric drive unit unless the sensor senses the connecting socket in the resting position.

3. The electric traction motorcycle of claim 1, wherein:
   a bayonet-like connection is provided between the connecting socket and the seat thereof in the resting position, and
   said sensor is a proximity sensor or microswitch in said bayonet-like connection.

4. The electric traction motorcycle of claim 1, wherein:
   said power supply unit is located below said helmet carrying compartment, so that said saddle, said helmet carrying compartment, and said power supply unit are substantially arranged stacked on each other inside the shell body.

5. The electric traction motorcycle of claim 1, wherein:
   said power unit comprises a battery unit, and
   the body shell defines and limits laterally a housing space configured to receive said supply unit.

6. The electric traction motorcycle of claim 5, wherein:
   said housing space receives the battery unit extending transversally from side to side of the housing space.

7. The electric traction motorcycle of claim 5, wherein:
   the power unit further comprises a motor generator.

8. The electric traction motorcycle of claim 7, wherein:
   said housing space receives the battery unit and the motor generator, placed side by side to one another.

9. The electric traction motorcycle of claim 7, wherein:
   said motor generator comprises a combustion engine fed by a tank which is arranged so as to partially surround side walls of the helmet carrying compartment in a position adjacent to the power lead cable compartment.

10. The electric traction motorcycle of claim 9, wherein:
    the tank has an upper end arranged near the saddle, with a fueling nozzle closed by a fuel stopper, projecting from the service surface of the shell body.

11. The electric traction motorcycle of claim 9, wherein:
    the tank is placed above the battery unit.

* * * * *